(12) United States Patent
Sano

(10) Patent No.: US 7,443,827 B2
(45) Date of Patent: Oct. 28, 2008

(54) MOBILE COMMUNICATION SYSTEM, MULTICARRIER CDMA TRANSMITTER, AND MULTICARRIER CDMA RECEIVER

(75) Inventor: Hiroyasu Sano, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 890 days.

(21) Appl. No.: 10/468,222

(22) PCT Filed: Feb. 14, 2002

(86) PCT No.: PCT/JP02/01245

§ 371 (c)(1),
(2), (4) Date: Aug. 18, 2003

(87) PCT Pub. No.: WO02/067478

PCT Pub. Date: Aug. 29, 2002

(65) Prior Publication Data

US 2004/0076172 A1    Apr. 22, 2004

(30) Foreign Application Priority Data

Feb. 20, 2001   (JP) ............................. 2001-044101

(51) Int. Cl.
*H04B 7/216* (2006.01)
*H04B 1/02* (2006.01)
*H04B 1/06* (2006.01)

(52) U.S. Cl. ................. 370/342; 375/135; 375/136; 455/522; 455/226.3

(58) Field of Classification Search ................. 370/210, 370/342, 343, 441, 479, 480, 491; 455/226.3, 455/127.1, 135, 522; 375/146, 147, 227, 375/135, 136

See application file for complete search history.

(56) References Cited

U.S. PATENT DOCUMENTS

| 6,404,759 | B1 * | 6/2002 | Shoji ..................... 370/342 |
| 6,418,134 | B1 * | 7/2002 | Geddes et al. .......... 370/342 |
| 6,801,566 | B2 * | 10/2004 | Ha ........................ 375/148 |
| 6,868,112 | B2 * | 3/2005 | Kim et al. .............. 375/147 |
| 2004/0037262 | A1 * | 2/2004 | Tanada ................... 370/342 |

FOREIGN PATENT DOCUMENTS

| EP | 1128592 | 8/2001 |
| WO | 99/01956 | 1/1999 |

OTHER PUBLICATIONS

Hiroyuki Arata et al.: "Tachi hencho to hybride ARQ o mochiita broadband packet TD-OFCDM kudari kosoku Denso" The Institute of Electronics, Information and Communication Engineers, Gijutsu Kenkyu Hokoku, vol. 100, No. 435, pp. 57-62, Nov. 17, 2000.

(Continued)

*Primary Examiner*—Aung S. Moe
*Assistant Examiner*—Feben M Haile
(74) *Attorney, Agent, or Firm*—Oblon, Spivak, McClelland, Maier & Neustadt, P.C.

(57) ABSTRACT

A transmitting apparatus adds a common pilot symbol and known series for each data slot of a subcarrier group. A receiving apparatus combines SIR calculation values obtained for each subcarrier group, and averages the SIR calculation values. Based on this, it is possible to obtain a high-precision SIR calculation value even when there is a level fluctuation such as shadowing.

25 Claims, 19 Drawing Sheets

OTHER PUBLICATIONS

Sadayuki Abeta et al.: "Kudari link broadband musen paket denso ni okeru SC/DS-CDMA, MC/DS-CDMA, MC-CDMA hosiki no tokusei hikaku" The Institute of Electronics, Information and Communication Engineers, Gijutsu Kenkyu Hokoku, vol. 99, No. 357, pp. 63-70, Oct. 15, 1999.

Shinsuke Hara et al.: "Overview of multicarrier CDMA" IEEE Communication Magazine, pp. 126-133 Dec. 1997.

Hiroyuki Arata et al.: "Tachi hencho to hybride ARQ o mochiita broadband packet TD-OFCDM kudari kosoku Denso" The Institute of Electronics, Information and Communication Engineers, Gijutsu Kenkyu Hokoku, vol. 100, No. 435, pp. 57-62, Nov. 17, 2000(With English Translation).

Sadayuki Abeta et al.: "Kudari link broadband musen paket denso ni okeru SC/DS-CDMA, MC/DS-CDMA, MC-CDMA hosiki no tokusei hikaku" The Institute of Electronics, Information and Communication Engineers, Gijutsu Kenkyu Hokoku, vol. 99, No. 357, pp. 63-70, Oct. 15, 1999(With English Translation).

\* cited by examiner

MOBILE COMMUNICATION SYSTEM, MULTICARRIER CDMA TRANSMITTER, AND MULTICARRIER CDMA RECEIVER

TECHNICAL FIELD

The present invention relates to a mobile communication system that employs a multicarrier CDMA, a multicarrier CDMA transmitting apparatus (hereinafter, "transmitting apparatus"), and a multicarrier CDMA (Code Division Multiple Access) receiving apparatus (hereinafter, "receiving apparatus"). The present invention relates, more particularly, to a transmitting apparatus and a receiving apparatus that are used in a frequency selective fading transmission line.

BACKGROUND ART

A conventional mobile communication system that employs a multicarrier CDMA is explained below. Transmitting and receiving apparatuses of a mobile communication system according to a multiple access system using a multicarrier CDMA system are described in, for example, "Comparison of characteristics between the SC (Single Carrier)/DS (Direct Spread)-CDMA, MC (Multi Carrier)/DS-CDMA, and MC-CDMA systems in the down link broadband radio packet transmission, The Institute of Electronics, Information and Communication Engineers, Technical Report of IEICE RCS99-130, pp. 0.63-70, October 1999", and "Overview of Multicarrier CDMA, IEEE Communications Magazine, pp. 126-133, December, 1997".

FIG. 14 shows a structure of the conventional multicarrier CDMA transmitting apparatus described in the above literatures. In FIG. 14, a reference numeral 201 denotes a serial to parallel converter (S/P), 202-1, 202-2, ..., and 202-n denote a first, a second, ..., and an $N_{scg}$ (=n)-th subcarrier group modulation processors respectively, 203-1, 203-2, ..., and 203-n denote multiplexers respectively, 204 denotes an inverse Fourier transform calculator, 205 denotes a guard interval (GI) adder, 206 denotes a frequency converter, and 207 denotes an antenna. In the subcarrier group modulation processors 202-1, 202-2, ..., and 202-n, reference numerals 211-1, 211-2, ..., and 211-n denote slot generators respectively, 212-1, 212-2, ..., and 212-n denote copying sections respectively, 213-1, 213-2, ..., and 213-k denote information modulators respectively, and 214-1, 214-2, ..., and 214-n denote spread spectrum sections respectively.

FIG. 15 shows a structure of the conventional multicarrier CDMA receiving apparatus described in the above literatures. In FIG. 15, a reference numeral 301 denotes an antenna, 302 denotes a frequency converter, 303 denotes a guard interval (GI) remover, 304 denotes a Fourier transform calculator, 305-1, 305-2, 305-3, ..., and 305-m denote common pilot extractors respectively, 306 denotes a by-subcarrier channel estimator, 307 denotes a delay unit, 308-1, 308-2, 308-3, ..., and 308-m denote fading compensating sections respectively, 309 denotes an inverse spread spectrum section, 310 denotes a parallel to serial converter (P/S), and 311 denotes a data deciding section.

The operations of the conventional multicarrier CDMA transmitting and receiving apparatuses are explained below. Data transmission and reception between a base station and a plurality of terminals is assumed.

First, the operation of the transmitting apparatus is explained. Transmission data to be transmitted to an optional terminal is input to the serial to parallel converter 201, which converts the data into parallel data of a parallel number $N_{scg}$ (that is, a predetermined integer). The parallel data reach the subcarrier group modulation processors 202-1 to 202-n respectively. All of the first to the $N_{scg}$-th subcarrier group modulation processors carry out the same signal processing for each subcarrier group. Therefore, the operation of the first subcarrier group modulation processor 202-1 is explained here, and the explanation of the operation of the rest of the subcarrier group modulation processors is omitted.

Of the parallel data output from the serial to parallel converter 201, the first data series is input to the subcarrier group modulation processor 202-1. The slot generator 211-1 divides the received data series into $N_{data}$, and adds a common pilot symbol to the header of each of the divided data, thereby to prepare a frame of one data slot or N data slots. FIG. 16 shows a frame format of a subcarrier unit. As shown in this drawing, the data slot consists of a pilot symbol portion (that is, a known series), and a data portion.

The copying section 212-1 receives the data slot of the first subcarrier group, copies the frame by a predetermined number of subcarriers $N_{sub}$ (=m), and prepares the data slots of the $N_{sub}$ subcarriers. FIG. 17 shows in detail a structure of, for example, the copying section 212-1. The copying section 212-1 outputs the $N_{sub}$ data slots to the information modulator 213-1. Other copying sections have structure similar to that of the copying section 212-1.

FIG. 18 shows in detail a structure of, for example, the information modulator 213-1. In FIG. 18, reference numerals 221-1, 221-2, ..., and 221-m denote QPSK modulators respectively. The information modulator 213-1 receives the $N_{sub}$ data slots, and the QPSK modulators 221-1 to 221-m carry out QPSK modulation of the corresponding data slots, thereby to prepare $N_{sub}$ information-modulated subcarrier signals. The information modulator 213-1 outputs the $N_{sub}$ information-modulated subcarrier signals to the spread spectrum section 214-1. Other information modulators have structure similar to that of the information modulator 213-1.

FIG. 19 shows in detail a structure of, for example, the spread spectrum section 214-1. In FIG. 19, a reference numeral 222 denotes a spread spectrum code generator, and 223-1, 223-2, ..., and 223-m denote multipliers respectively. The spread spectrum section 214-1 spreads the spectrum of the $N_{sub}$ information-modulated subcarrier signals respectively by using mutually orthogonal spread spectrum codes (which are expressed as ±1) given in advance in a plurality of terminals or other transmission channels. More specifically, the spread spectrum section 214-1 multiplies the $N_{sub}$ information-modulated subcarrier signals by each spread spectrum code that is output from the spread spectrum code generator 222. For the spread spectrum codes, orthogonal codes of Walsh codes are generally used. The spread spectrum section 214-1 outputs the $N_{sub}$ subcarrier signals after the spread spectrum to the multiplexer 203-1. Other spread spectrum sections have structure similar to that of the spread spectrum section 214-1.

The multiplexer 203-1 receives the $N_{sub}$ subcarrier signals after the spread spectrum, multiplexes these subcarrier signals (that is, transmission signals to be transmitted to the terminals), and outputs the multiplexed subcarrier signals to the inverse Fourier transform calculator 204. At this time, the inverse Fourier transform calculator 204 receives the inputs of all the $N_{scg} \times N_{sub}$ (=$N_c$) subcarrier signals, which includes the multiplexed subcarrier signals obtained from the multiplexers 203-2 to 203-n, in addition to the input from the multiplexer 203-1. Other multiplexers have functions similar to that of the multiplexer 203-1.

The inverse Fourier transform calculator 204 calculates inverse Fourier transform of the subcarrier signals received, and outputs the resultant inverse Fourier-transformed signals to the guard interval adder 205.

FIG. 20 explains how the guard interval adder 205 adds the guard intervals. The inverse Fourier-transformed signals output from the Fourier transform calculator 204 are continuous signals of symbols. The guard interval adder 205 copies a portion at the end of the Fourier-transformed signal of each symbol corresponding to a time $\tau_{GI}$, and adds that portion of the signal to the header of the signals for that symbol. The guard interval adder 205 outputs the guard interval-added signals to the frequency converter 206. In general, $\tau_{GI}$ is set larger than the spread of delayed waves on transmission lines, that is, $\tau_d$, shown in FIG. 21. FIG. 21 shows one example of impulse responses on frequency selective fading transmission lines. As waves are reflected, diffracted, and scattered by the surrounding buildings and topography, these waves (that is, multi-path waves) arrive in the mobile communication system after passing through a plurality of transmission lines, and these waves interfere with each other (that is, frequency selective fading).

The frequency converter 206 carries out a predetermined frequency conversion processing to the received guard interval-added signals, and outputs the frequency-converted signals to the radio communication transmission lines via the antenna 207. FIG. 22 shows modulation signals on the frequency axis when $N_{scg}$ is equal to four and $N_{sub}$ is equal to eight, for example.

The operations of the receiving apparatus will be explained next with reference to FIG. 15. The frequency converter 302 receives, via the antenna 301, the signals influenced by the frequency selective fading on the radio communication lines, and converts these signals into baseband signals. The frequency converter 302 outputs the baseband signals to the guard interval remover 303.

The guard interval remover 303 removes the guard intervals from the received baseband signals, and generates the continuous signals of symbols (refer to the upper portion in FIG. 20). The guard interval remover 303 outputs the signals generated to the Fourier transform calculator 304.

The Fourier transform calculator 304 calculates Fourier transform of the signals received, and generates $N_{scg} \times N_{sub}$ ($=N_c$) subcarrier signals. The Fourier transform calculator 304 outputs all the subcarrier signals to the delay unit 307, and also outputs the subcarrier signal of each subcarrier to a corresponding one of the common pilot extractors 305-1 to 305-m.

The common pilot extractors 305-1 to 305-m extract common pilot portions from the received subcarrier signals respectively. The by-subcarrier channel estimator 306 adds in-phase channel estimate values of adjacent three subcarriers, thereby to obtain the channel estimate value of each subcarrier after suppressing noise component. The by-subcarrier channel estimator 306 outputs the channel estimate value of each subcarrier to the fading compensating sections 308-1 to 308-m in subcarrier unit.

On the other hand, the delay unit 307 receives each Fourier-transformed subcarrier signal, and delays each signal to adjust delays due to the processing in the common pilot extractors 305-1 to 305-m and the processing in the by-subcarrier channel estimator 306. The delay unit 307 outputs the respective delayed subcarrier signals to the fading compensating sections 308-1 to 308-m.

FIG. 23 shows a structure of, for example, the fading compensating section 308-1. In FIG. 23, a reference numeral 321 denotes a multiplier, and 322 denotes a complex conjugate number calculator. The complex conjugate number calculator 322 receives the channel estimate value in subcarrier unit, and calculates a complex conjugate number of the estimate value. The multiplier 321 multiplies the received subcarrier signal by the calculated complex conjugate number, and outputs the fading-compensated subcarrier signal as the result of the multiplication. The multiplier 321 outputs the fading-compensated subcarrier signal to the inverse spread spectrum section 309. Other fading compensating sections have structure similar to that of the fading compensating section 308-1.

FIG. 24 shows a structure of the inverse spread spectrum section 309. In FIG. 24, a reference numeral 323 denotes an inverse spread spectrum code generator, 324-1, 324-2, . . . , and 324-m denote multipliers, and 325 denotes a combiner. For example, $N_{sub}$ subcarrier signals corresponding to each subcarrier group shown in FIG. 22 are handled as one unit of processing, and $N_{sub}$ subcarrier signals are input to each of the multipliers 324-1 to 324-m. Each of the multipliers 324-1 to 324-m multiplies the $N_{sub}$ subcarrier signals by the inverse spread spectrum code (which is the same as the spread spectrum code and which can be expressed as ±1) that is output from the inverse spread spectrum code generator 323. The combiner 325 combines the received inversely-spread $N_{sub}$ subcarrier signals, and generates an inverse spread spectrum signal corresponding to the subcarrier group signals as the result of the combining. The combiner 325 outputs the frequency inversely-spread signal to the parallel to serial converter 310.

The parallel to serial converter 310 carries out a parallel to serial conversion of the received frequency inversely-spread signal. Last, the data deciding section 311 decides about the data of the converted signal, and demodulates the data.

However, the above conventional mobile communication system has the following problems.

For example, according to the conventional mobile communication system, multi-path waves passing through a plurality of transmission lines arrive at a mobile station, as waves that are reflected, diffracted, and scattered by the surrounding buildings and topography. These multi-path waves interfere with each other, and the frequency selective fading, that is a random fluctuation in the amplitude and the phase of the reception wave, occurs. Particularly, when the mobile station moves at a high speed, the fluctuation due to the frequency selective fading becomes at a high speed. Therefore, there has been a problem that it is not possible to sufficiently estimate the amplitude fluctuation and the phase fluctuation due to the fading, and the quality of the reception signal and the data demodulation precision are degraded.

According to the conventional mobile communication system, the multicarrier CDMA receiving apparatus calculates the degraded reception signal quality, and the multicarrier CDMA transmitting apparatus uses the degraded reception signal quality to control the transmission power. Therefore, there has been a problem that the communication quality is also degraded.

According to the conventional mobile communication system, when the transmission signal from the base station receives the influence of the frequency selective fading on the transmission line, a plurality of delayed waves exist depending on the states of the transmission lines. Therefore, there has been a problem that it is difficult to calculate the signal power already arrived at the mobile station as a criterion of the reception signal quality. Further, when the interference occurs due to the multiple user signals, it has been difficult to estimate in high precision the reception signal quality that takes into account this user interference.

In the multimedia mobile communications, the transmitting apparatus needs to change the spread spectrum rate or multiple values of the modulation signal and adaptively change the information speed according to the handled application and the states of the transmission lines. However, according to the conventional mobile communication system, there has been a problem that it is not possible to estimate the reception signal quality in high precision because of level fluctuations such as fading and shadowing.

It is an object of the present invention to at least solve the problems in the conventional technology.

DISCLOSURE OF THE INVENTION

The mobile communication system according to one aspect of the present invention, which employs a multicarrier code division multiple access, comprises a transmitting apparatus and a receiving apparatus. The transmitting apparatus has a slot generating unit that generates, for each subcarrier group unit, a slot consisting of a common pilot portion, a known series portion which the receiving apparatus uses to estimate a signal to interference ratio, and a data portion, by using transmission data converted for each subcarrier group, copies each slot by a predetermined number of subcarriers, and outputs the slots; a modulating unit that modulates the signal copied for each subcarrier unit within the subcarrier group; a spread spectrum unit that individually carries out frequency spreading to a subcarrier signal within the modulated subcarrier group; a transmission power control unit that controls transmission power of the subcarrier signal after the spread spectrum, for each subcarrier group; a multiplexing unit that multiplexes the subcarrier signal after the transmission power control, for each subcarrier group; and a transmitting unit that generates a predetermined signal by carrying out an inverse Fourier transformation processing, a guard interval setting processing, and a frequency conversion processing to the multiplexed subcarrier signal, and transmits the signal generated to a transmission line.

The receiving apparatus has a receiving unit that receives a signal via the transmission line, converts the signal received into a baseband signal, and carries out a Fourier transformation processing to the baseband signal; a common pilot extracting unit that extracts the common pilot portion included in each of the Fourier-transformed subcarrier signals; a channel estimating unit that calculates a channel estimate value for each subcarrier, by using the common pilot portion; a delay unit that delays each Fourier-transformed subcarrier signal by a time required to carry out the extraction processing, and the channel estimate processing; a fading compensating unit that carries out a fading compensation to each of the delayed subcarrier signals, by using each of the channel estimate values; an inverse spread spectrum unit that inverse spreads a frequency of each of the fading-compensated subcarrier signals; an SIR estimating unit that estimates a signal to interference ratio by using the known series portion included in the subcarrier group signal after the inverse spread spectrum; and a demodulating unit that demodulates the subcarrier group signal after the inverse spread spectrum.

The multicarrier code division multiple access transmitting apparatus according to another aspect of the present invention comprises a slot generating unit that generates, for each subcarrier group unit, a slot consisting of a common pilot portion, a known series portion which a receiving apparatus uses to estimate a signal to interference ratio, and a data portion, by using transmission data converted for each subcarrier group, copies each slot by a predetermined number of subcarriers, and outputs the slots; a modulating unit that modulates the copied signal for each subcarrier unit within the subcarrier group; a spread spectrum unit that frequency spreads a spectrum of each of subcarrier signals within the modulated subcarrier group; a transmission power control unit that controls transmission power of the subcarrier signal after the spread spectrum, for each subcarrier group; a multiplexing unit that multiplexes the subcarrier signal after the transmission power control, for each subcarrier group; and a transmitting unit that generates a predetermined signal by carrying out an inverse Fourier transformation processing, a guard interval setting processing, and a frequency conversion processing to the multiplexed subcarrier signal, and transmits the generated signal to a transmission line.

The multicarrier code division multiple access receiving apparatus according to another aspect of the present invention comprises a receiving unit that converts the received signal on the transmission line into a baseband signal, and carries out a Fourier transformation processing to the baseband signal; a common pilot extracting unit that extracts the common pilot portion included in each of the Fourier-transformed subcarrier signals; a channel estimating unit that calculates a channel estimate value for each subcarrier, by using the common pilot portion; a delay unit that delays each Fourier-transformed subcarrier signal by a time required to carry out the extraction processing, and the channel estimate processing; a fading compensating unit that carries out a fading compensation to each of the delayed subcarrier signals, by using each of the channel estimate values; an inverse spread spectrum unit that inverse spreads a frequency of each of the fading-compensated subcarrier signals; a SIR estimating unit that estimates the signal to interference ratio by using the known series portion included in the subcarrier group signal after the inverse spread spectrum; and a demodulating unit that demodulates the subcarrier group signal after the inverse spread spectrum.

BEST MODE FOR CARRYING OUT THE INVENTION

The mobile communication system, the multicarrier CDMA transmitting apparatus (hereinafter, "transmitting apparatus"), and the multicarrier CDMA receiving apparatus (hereinafter "receiving apparatus") according to the embodiments of the present invention are explained below with reference to the drawings. The present invention is not limited by these embodiments.

First Embodiment

Figure 1:
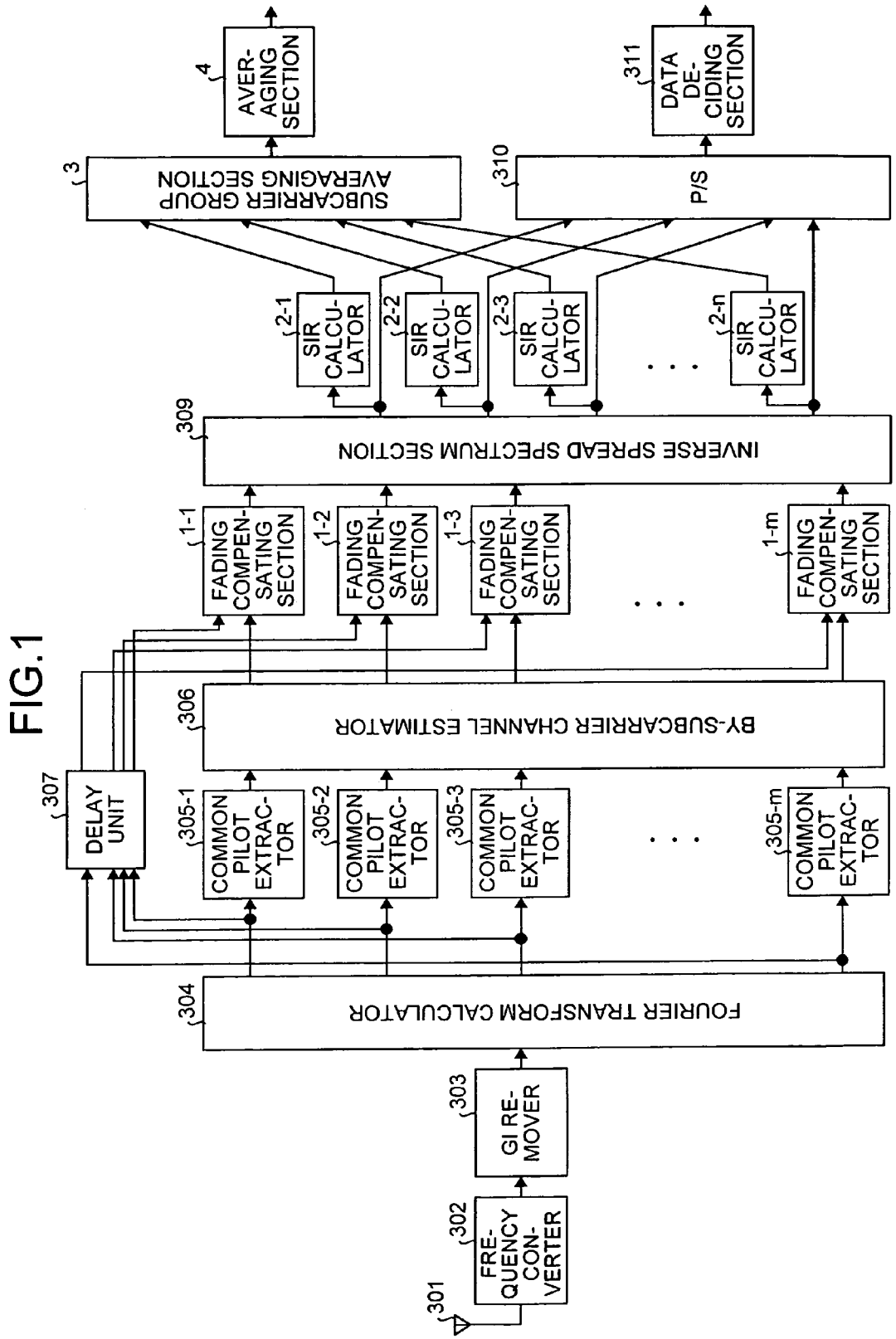
FIG. 1 shows a structure of a receiving apparatus according to a first embodiment of the present invention.

FIG. 1 shows a structure of the receiving apparatus according to a first embodiment of the present invention. In FIG. 1, the reference numeral 301 denotes the antenna, 302 denotes the frequency converter, 303 denotes the guard interval remover, 304 denotes the Fourier transform calculator, 305-1 to 305-m denote the common pilot extractors respectively, 306 denotes the by-subcarrier channel estimator, 307 denotes the delay unit, 1-1, 1-2, 1-3, . . . , and 1-m denote fading compensating sections respectively, 309 denotes the inverse spread spectrum section, 2-1, 2-2, 2-3, . . . , and 2-n denote SIR calculators, 310 denotes the parallel to serial converter, 311 denotes the data deciding section, 3 denotes a subcarrier group averaging section, and 4 denotes an averaging section.

Figure 2:
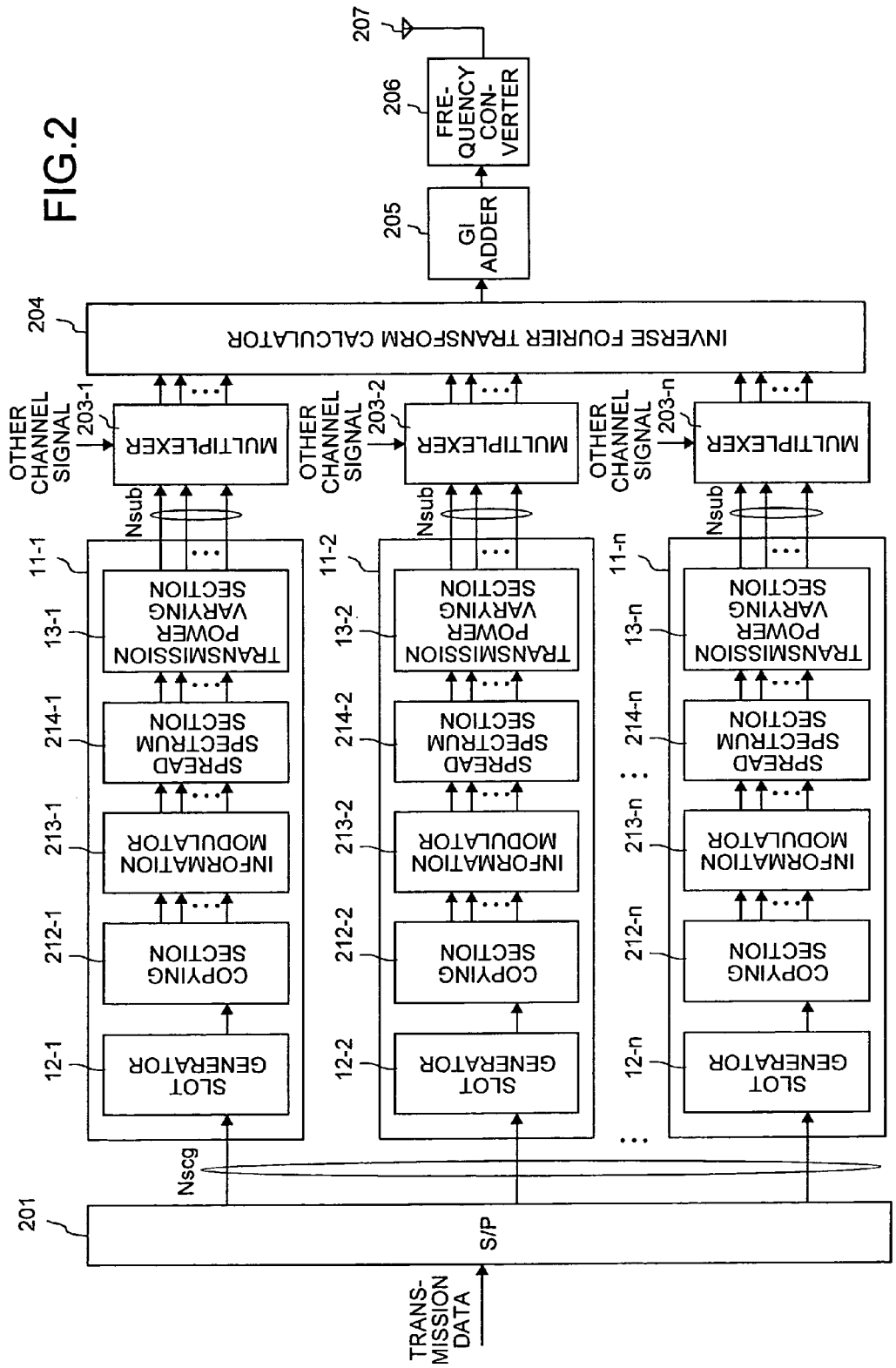
FIG. 2 shows a structure of a transmitting apparatus according to the first embodiment.

FIG. 2 shows a structure of the transmitting apparatus according to the first embodiment. In FIG. 2, the reference numeral 201 denotes the serial to parallel converter (S/P), 11-1, 11-2, . . . , and 11-n denote a first, a second, . . . , and a $N_{scg}$ (=n)-th subcarrier group modulation processors respectively, 203-1, 203-2, . . . , and 203-n denote the multiplexers respectively, 204 denotes the inverse Fourier transform calculator, 205 denotes the guard interval (GI) adder, 206 denotes the frequency converter, and 207 denotes the antenna. In each subcarrier group modulation processor, 12-1, 12-2, . . . , and 12-n denote slot generators, 212-1, 212-2, . . . , and 212-n denote the copying sections respectively, 213-1, 213-2, . . . , 213-n denote the information modulators respectively, 214-1, 214-2, . . . , and 214-n denote the spread spectrum sections respectively, and 13-1, 13-2, . . . , and 13-n denote transmission power varying sections respectively.

The operation of the multicarrier CDMA transmitting and receiving apparatuses in the mobile communication system according to the present embodiment is explained. Data transmission and reception between a base station and a plurality of terminals is assumed.

First, the operation of the transmitting apparatus is explained. Transmission data to be transmitted to an optional terminal is input to the serial to parallel converter 201, which converts the data into parallel data so that the parallel number of the data becomes $N_{scg}$ (that is, a predetermined integer). The parallel data reach the subcarrier group modulation processors 11-1 to 11-n respectively. Each of the first to the $N_{scg}$-th subcarrier group modulation processors carries out the same signal processing of the modulation processing to each subcarrier group. Therefore, the operation of the first subcarrier group modulation processor 11-1 is explained here, and the explanation of the operation of the rest of the subcarrier group modulation processors is omitted.

Figure 3:
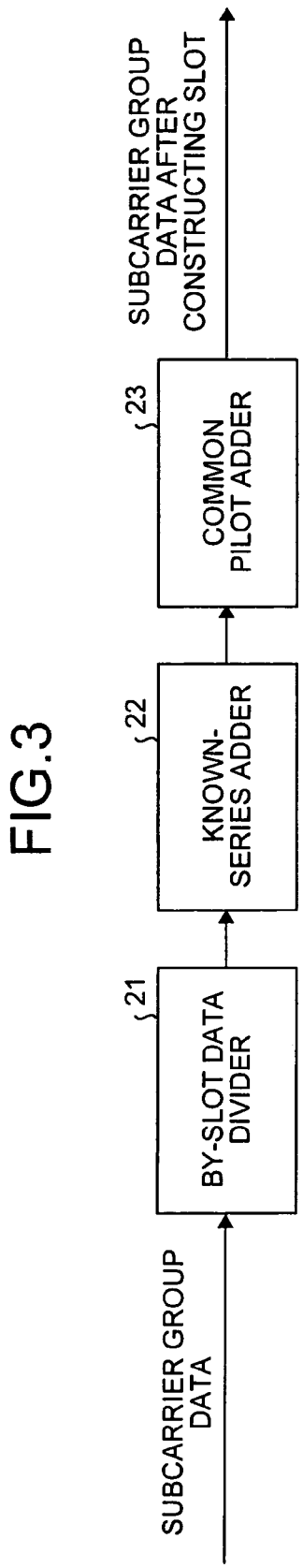
FIG. 3 shows a structure of a slot generator.
Figure 4:
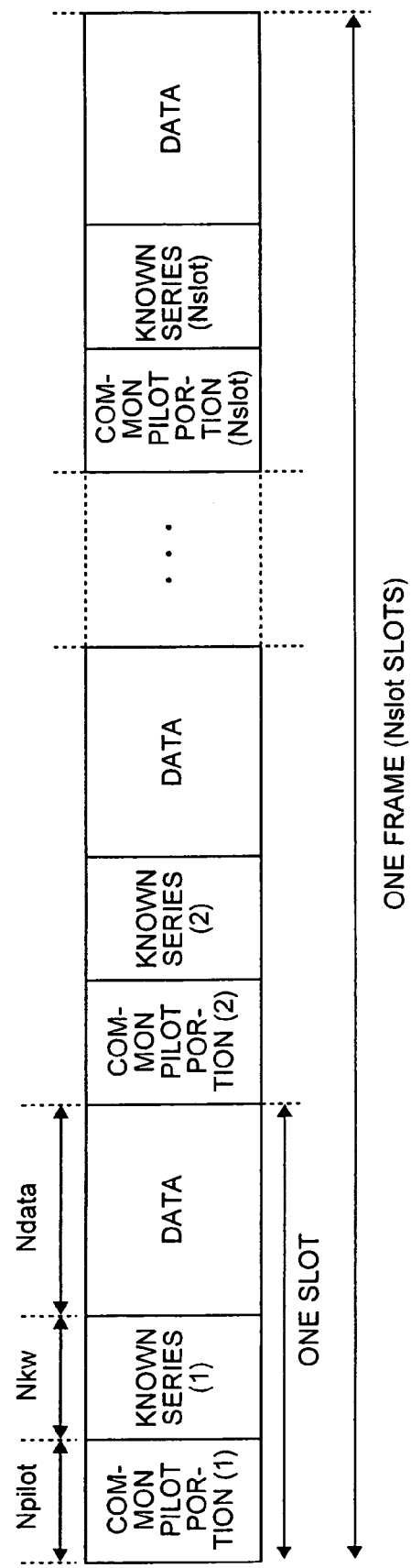
FIG. 4 shows a slot format of a subcarrier.

Of the parallel data output from the serial to parallel converter 201, the first data series is input to the subcarrier group modulation processor 11-1. The slot generator 12-1 prepares a predetermined slot. FIG. 3 shows in detail a structure of, for example, the slot generator 12-1. A reference numeral 21 denotes a by-slot data divider, 22 denotes a known-series adder, and 23 denotes a common pilot adder. FIG. 4 shows a slot format for each subcarrier. Specifically, in the slot generator 12-1, in order to generate the slot shown in FIG. 4, the by-slot data divider 21 divides the data into $N_{data}$ symbols as a slot data size. The known-series adder 22 receives the data after the data division processing, and adds known series of $N_{kw}$ symbols set in advance, to the data. The common pilot adder 23 receives the data added with the known series, and adds known series of $N_{pilot}$ symbols set in advance, to this data, thereby to finally prepare the subcarrier group data in the slot structure shown in FIG. 4. The common pilot adder 23 outputs the subcarrier group data to the copying section 212-1. Other slot detectors have a structure similar to that of the slot detector 12-1.

Figure 17:
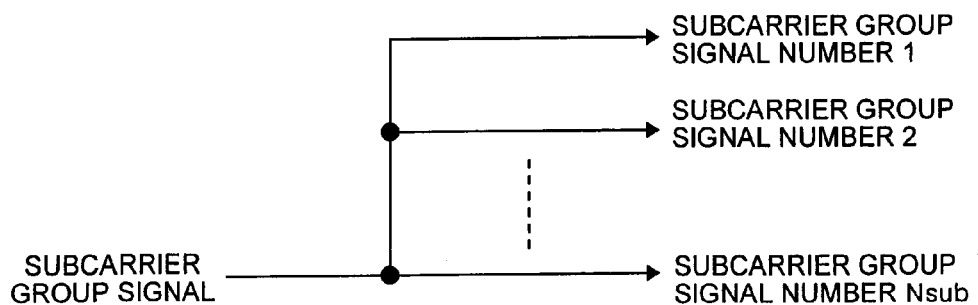
FIG. 17 shows a structure of a copying section.

The copying section 212-1 receives the first subcarrier group data, copies the frame by a predetermined number of subcarriers $N_{sub}$ (=m), and prepares the $N_{sub}$ subcarrier signals. The structure of copying section is similar to the one shown in FIG. 17. The copying section 212-1 outputs the $N_{sub}$ subcarrier signals to the information modulator 213-1.

Figure 18:
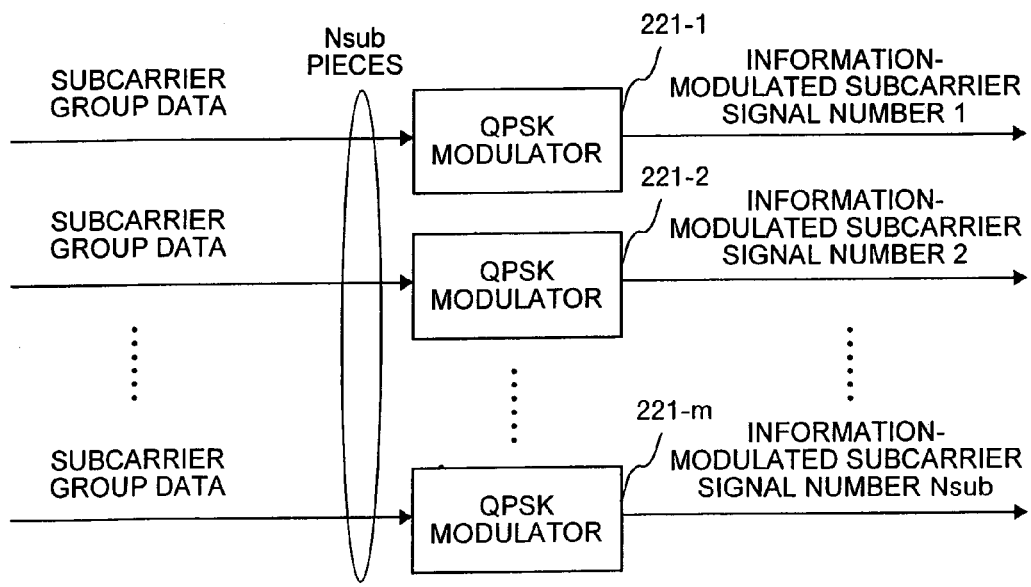
FIG. 18 shows a structure of an information modulator.

The information modulator 213-1 receives the $N_{sub}$ subcarrier signals, and carries out QPSK modulation of the signals with the QPSK modulators 221-1 to 221-m respectively, and prepares $N_{sub}$ information-modulated subcarrier signals. The structure of information modulator is similar to the one shown in FIG. 18. The information modulator 213-1 outputs the $N_{sub}$ information-modulated subcarrier signals to the spread spectrum section 214-1.

Figure 19:
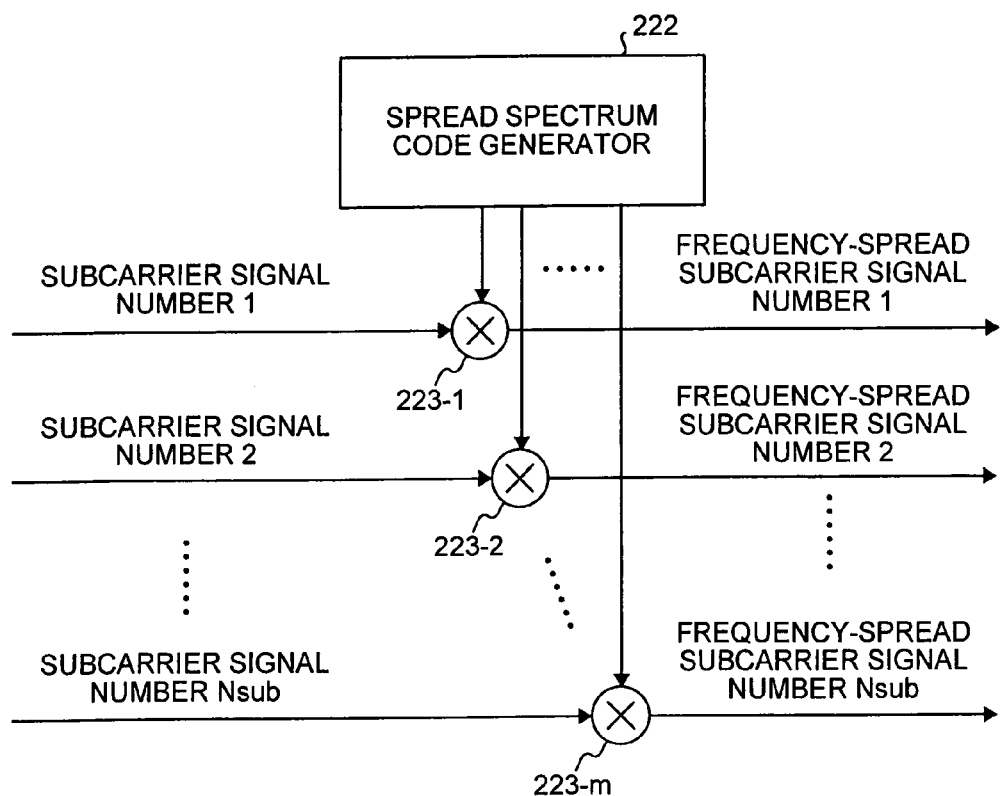
FIG. 19 shows a structure of a spread spectrum section.

The spread spectrum section 214-1 spreads the spectrum of the $N_{sub}$ information-modulated subcarrier signals respectively by using mutually quadrate spread spectrum codes (which are expressed as ±1) given in advance in a plurality of terminals or other transmission channels. The structure of spread spectrum section is similar to the one shown in FIG. 19. More specifically, the spread spectrum section 214-1 multiplies the $N_{sub}$ information-modulated subcarrier signals by each spread spectrum code that is output from the spread spectrum code generator 222. For the spread spectrum codes, orthogonal codes of Walsh codes are generally used. The spread spectrum section 214-1 outputs the $N_{sub}$ subcarrier signals after the spread spectrum to the transmission power varying section 13-1.

Figure 5:
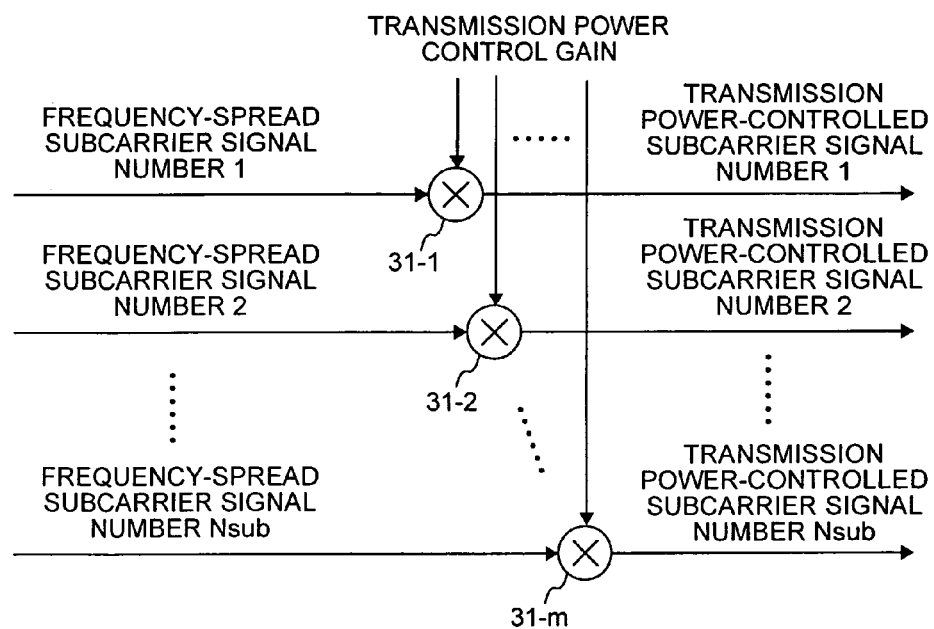
FIG. 5 shows a structure of a transmission power varying section.

FIG. 5 shows in detail a structure of, for example, a transmission power varying section 13-1. Reference numerals 31-1, 31-2, . . . , and 31-m denote multipliers. The transmission power varying section 13-1 multiplies the $N_{sub}$ subcarrier signals after the spread spectrum that the multipliers 31-1, 31-2, . . . , and 31-m received by transmission power control gains that correspond to these signals respectively, and generates transmission power-controlled subcarrier signals as results of the multiplication. The transmission power varying section 13-1 outputs the transmission power-controlled subcarrier signals to the multiplexer 203-1. For each transmission power control gain, a suitable value is set so that the receiving terminal can keep the signal quality at a constant level, based on the reception signal quality at the receiving terminal. Other transmission power varying sections have a structure similar to that of the transmission power varying section 13-1.

The multiplexer 203-1 receives the $N_{sub}$ transmission power-controlled subcarrier signals, multiplexes these subcarrier signals (that is, transmission signals to be transmitted to the terminals), and outputs the multiplexed subcarrier signals to the inverse Fourier transform calculator 204. At this time, the inverse Fourier transform calculator 204 receives the inputs of all the $N_{scg} \times N_{sub}$ (=$N_c$) subcarrier signals, which includes the multiplexed subcarrier signals obtained from the multiplexers 203-2 to 203-n, in addition to the input from the multiplexer 203-1. Other multiplexer perform functions similar to that of the multiplexer 203-1.

The inverse Fourier transform calculator 204 calculates inverse Fourier transform of the subcarrier signals received, and outputs the inverse Fourier-transformed signals to the guard interval adder 205.

Figure 20:
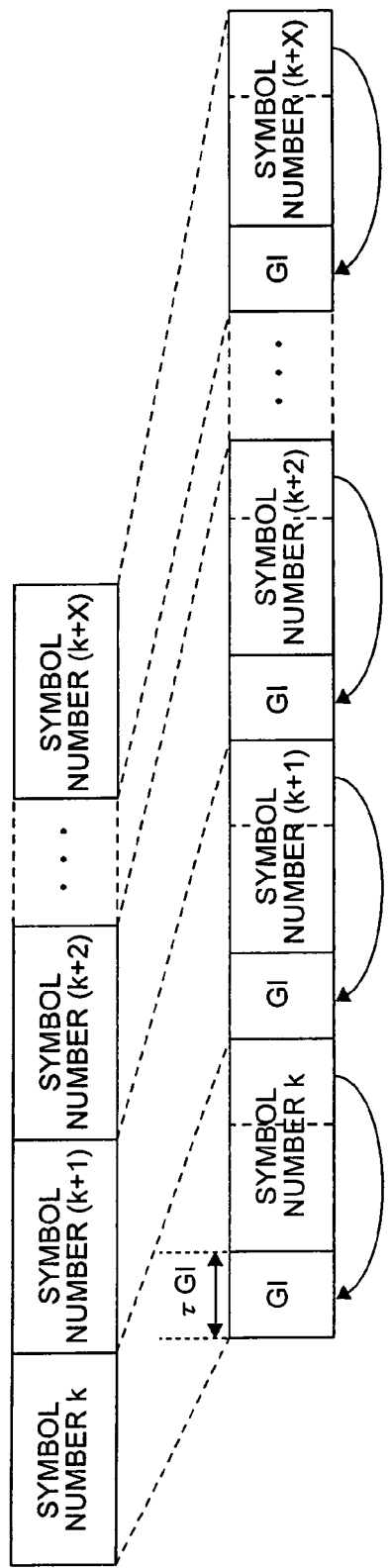
FIG. 20 explains how guard intervals are added to the signals.
Figure 21:
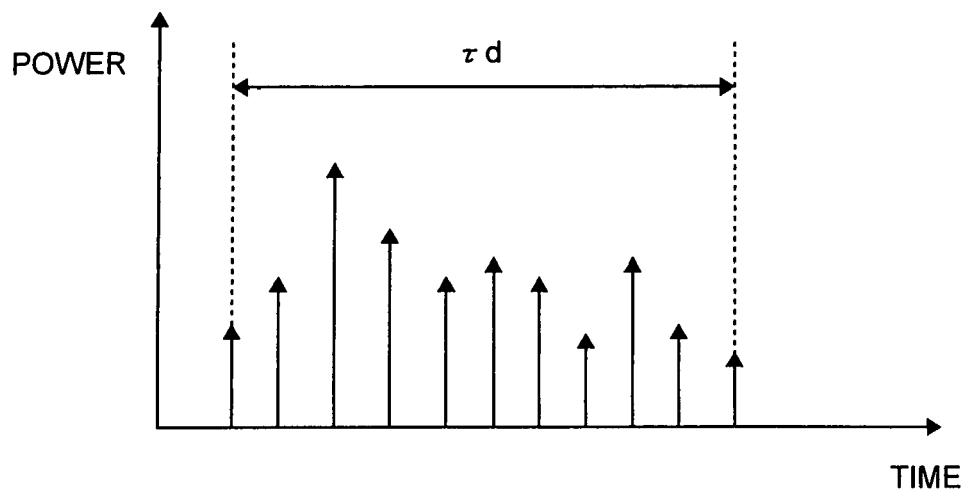
FIG. 21 shows one example of an impulse response of frequency selective fading transmission lines.
Figure 22:
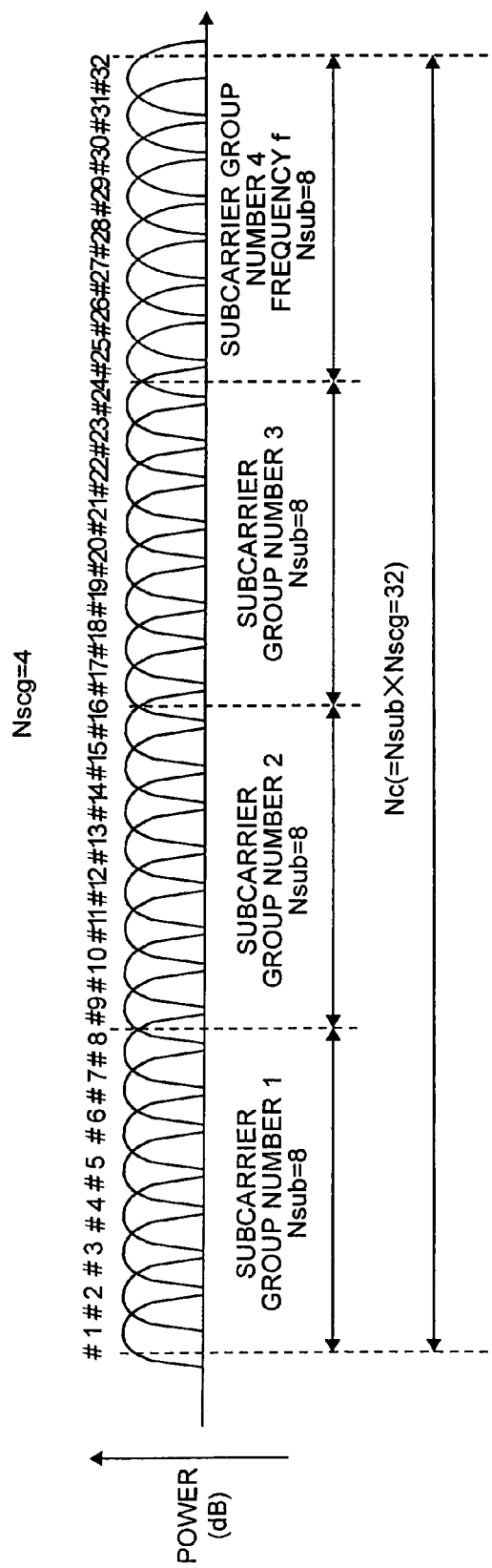
FIG. 22 shows modulation signals on the frequency axis when $N_{scg}$ is equal to four and also when $N_{sub}$ is equal to eight.
Figure 23:
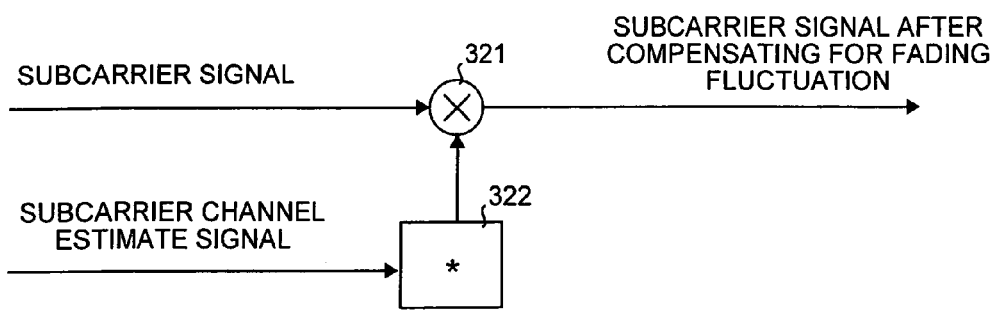
FIG. 23 shows a structure of fading compensating section.
Figure 24:
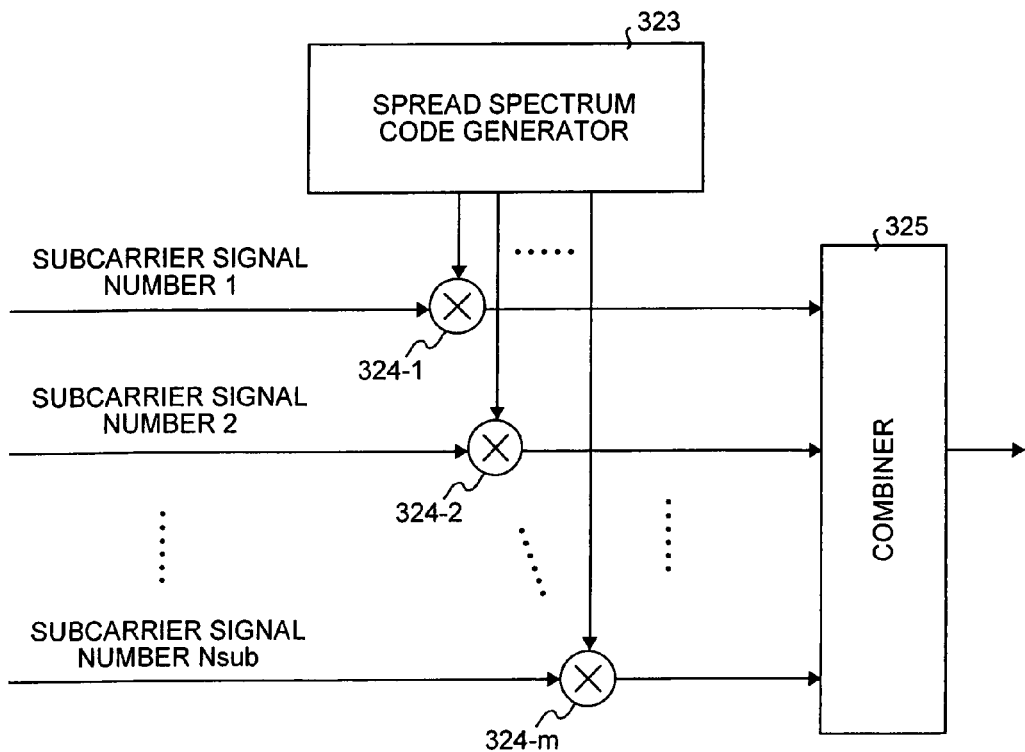
FIG. 24 shows a structure of an inverse spread spectrum section.

The guard interval adder 205 copies the latter portions of the symbols of the inverse Fourier-transformed signals corresponding to a time $\tau_{GI}$, and adds these portions to the headers of the symbols (refer to FIG. 20). The guard interval adder 205 outputs the guard interval-added signals to the frequency converter 206. In general, $\tau_{GI}$ is set larger than the spread of delayed waves on the transmission lines (refer to FIG. 21).

Finally, the frequency converter 206 carries out a predetermined frequency conversion processing to the received guard interval-added signals, and outputs the frequency-converted signals to the radio communication transmission lines via the antenna 207.

The operations of the receiving apparatus will be explained next with reference to FIG. 1. The frequency converter 302 receives, via the antenna 301, the signals influenced by the frequency selective fading on the radio communication lines, and converts these signals into baseband signals. The frequency converter 302 outputs the baseband signals to the guard interval remover 303.

The guard interval remover 303 removes the guard intervals (GI) from the received baseband signals, and generates the continuous signals of symbols (refer to the upper portion in FIG. 20). The guard interval remover 303 outputs the generated signals to the Fourier transform calculator 304.

The Fourier transform calculator 304 calculates Fourier transform of the signals received, and generates $N_{scg} \times N_{sub}$ (=$N_c$) subcarrier signals. The Fourier transform calculator 304 outputs each subcarrier signal of each subcarrier to the delay unit 307, and the common pilot extractors 305-1 to 305-m respectively.

The common pilot extractors 305-1 to 305-m extract common pilot portions from the received subcarrier signals respectively. The by-subcarrier channel estimator 306 adds in-phase channel estimate values of adjacent three subcarriers, thereby to calculate a channel estimate value of each subcarrier after suppressing noise component. The by-subcarrier channel estimator 306 outputs channel estimate values (that is, subcarrier channel estimate values) for each subcarrier to the fading compensating sections 1-1 to 1-m.

On the other hand, the delay unit 307 receives each Fourier-transformed subcarrier signal, and delays each signal to adjust delays due to the processing in the common pilot extractors 305-1 to 305-m and the processing in the by-subcarrier channel estimator 306. The delay unit 307 outputs the respective delayed subcarrier signals to the fading compensating sections 1-1 to 1-m.

Figure 6:
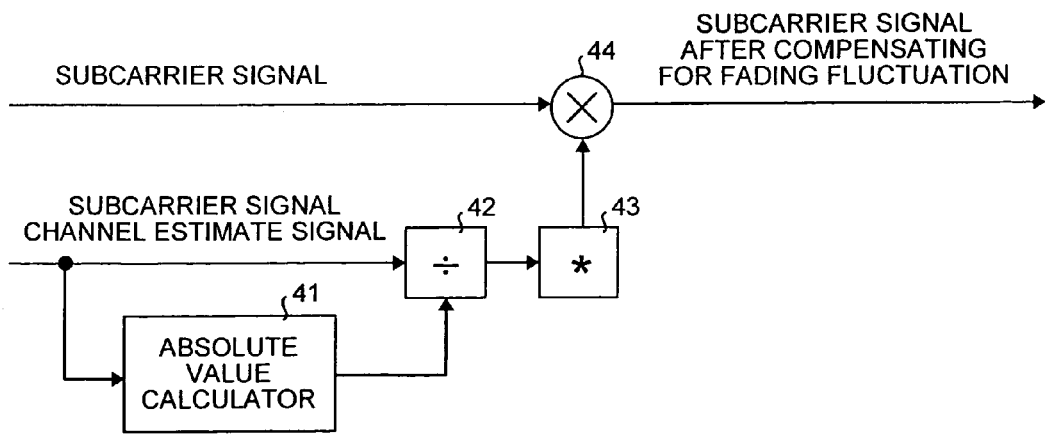
FIG. 6 shows a structure of a fading compensating section.

FIG. 6 shows in detail a structure of, for example, the fading compensating section 1-1. A reference numeral 41 denotes an absolute value calculator, 42 denotes a divider, 43 denotes a complex conjugate number calculator, and 44 denotes a multiplier. The fading compensating section 1-1 normalizes the subcarrier channel estimate signals based on a signal amplitude in order to compensate for the phase component due to the fading fluctuation. Specifically, the absolute value calculator 41 calculates an absolute value of the received subcarrier channel estimate value in order to calculate the amplitude of this subcarrier channel estimate value. The divider 42 divides the received subcarrier channel estimate value by this absolute value to carry out the normalization processing. The complex conjugate number calculator 43 receives the result of the division, and calculates a complex conjugate number based on the output from the divider 42. The multiplier 44 multiplies the received subcarrier signal by the calculated complex conjugate number. Last, the fading compensating section 1-1 outputs the fading-compensated subcarrier signal of each subcarrier to the inverse spread spectrum section 309. Other fading compensating sections have a structure similar to that of the fading compensating section 1-1.

The inverse spread spectrum section 309 handles the $N_{sub}$ subcarrier signals corresponding to each subcarrier group as one unit of processing. Each of the multipliers 324-1 to 324-m receives the $N_{sub}$ subcarrier signals, and multiplies the $N_{sub}$ subcarrier signals by the inverse spread spectrum code (which is the same as the spread spectrum code and which can be expressed as ±1) that is output from the inverse spread spectrum code generator 323. The combiner 325 combines the received inversely-spread $N_{sub}$ subcarrier signals, and generates an inverse spread spectrum signal corresponding to the subcarrier group signals as the result of the combining. The combiner 325 outputs the frequency inverse spread signal, for each subcarrier group, to the SIR calculators 2-1 to 2-n, and the parallel to serial converter 310.

Figure 7:
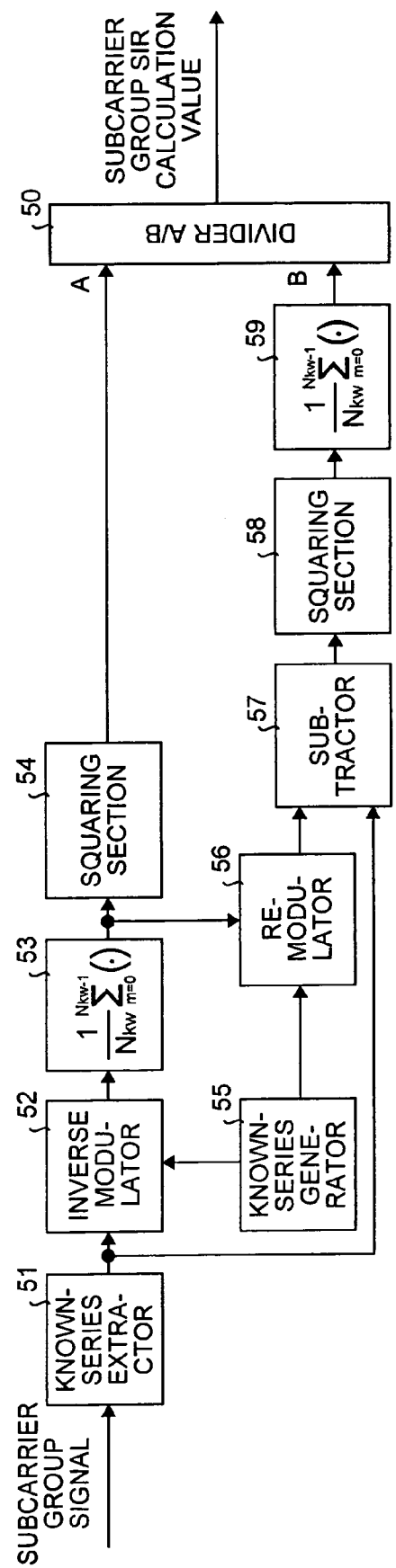
FIG. 7 shows a structure of SIR calculator.

FIG. 7 shows in detail a structure of, for example, the SIR calculator 2-1. A reference numeral 51 denotes a known-series extractor, 52 denotes an inverse modulator, 53 denotes an averaging section, 54 denotes a squaring section, 55 denotes a known-series generator, 56 denotes a re-modulator, 57 denotes a subtractor, 58 denotes a squaring section, 59 denotes an averaging section, and 60 denotes a divider. Other SIR calculators have a structure similar to, and perform functions similar to, that of the SIR calculator 2-1, and therefore, only the operations of the SIR calculator 2-1 will be explained below. In the SIR calculator 2-1, first the known-series extractor 51 extracts the known series shown in FIG. 4 from among the frequency inversely-spread subcarrier group signals received.

The inverse modulator 52 receives the extracted known-series portion, and removes the modulation component by utilizing the known series known in advance at the receiving terminal that the known-series generator 55 generates. Next, the averaging section 53 receives the known series portion after the removal of the modulation component, and carries out the in-phase averaging by using the $N_{kw}$ known-series portion symbols, thereby to suppress the noise component. Next, the squaring section 54 receives the known series portion after the averaging processing, and squares the known series portion.

On the other hand, the re-modulator 56 receives the known series that the receiving apparatus knows in advance and that is generated by the known series generator 55, and the known series portion after the averaging processing that is output from the averaging section 53. The re-modulator 56 carries out the modulation processing again by using these signals. In the present embodiment, the transmitting apparatus shown in FIG. 2 carries out the QPSK modulation as the information modulation. Therefore, the re-modulator 56 carries out the QPSK modulation again.

The subtractor 57 subtracts the re-modulated signal from the received known series portion that the known series detector 51 extracted. The subtractor 57 subtracts the signal by the number of $N_{kw}$ that corresponds to the number of known symbols, for each symbol. The squaring section 58 receives results of the subtraction, and calculates squared values of the $N_{kw}$ symbols. Next, the averaging section 59 averages the received squared results, thereby to obtain average interference power of the $N_{kw}$ symbols.

Finally, the divider 60 in the SIR calculator 2-1 divides the calculation result of the squaring section 54 by the calculation result of the averaging section 59, thereby to generate the SIR calculation value of the subcarrier group for each slot. The divider 60 outputs the SIR calculation value to the subcarrier group averaging section 3.

Referring back to FIG. 1, the subcarrier group averaging section 3 receives the SIR calculation values from all the SIR calculators 2-1 to 2-n, averages the $N_{scg}$ SIR calculation values, and outputs the averaged result to the averaging section 4.

Figure 8:
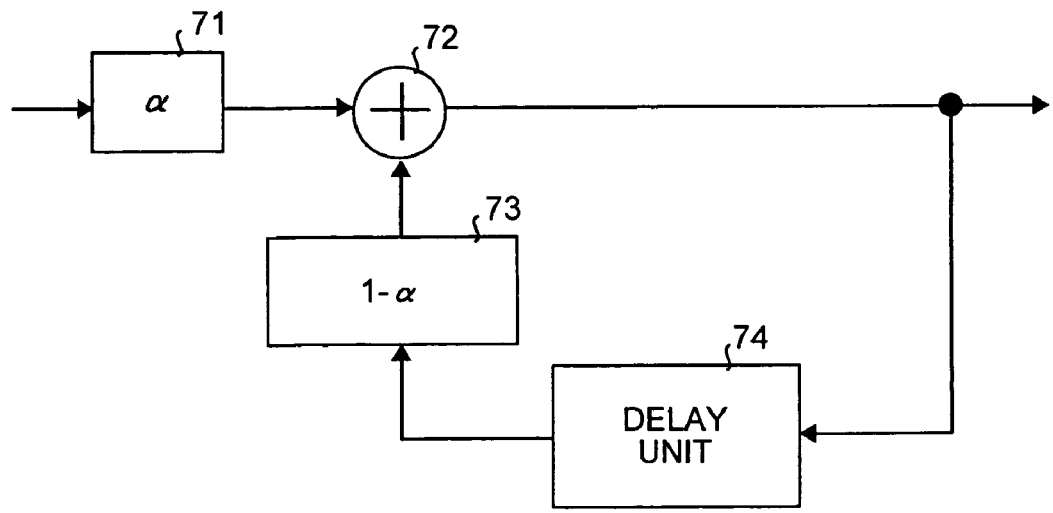
FIG. 8 shows a structure of an averaging section 4.

FIG. 8 shows in detail a structure of the averaging section 4. A reference numeral 71 denotes an amplifier, 72 denotes an adder, 73 denotes an amplifier, and 74 denotes a delay unit. In the averaging section 4, the amplifier 71 first multiplies the received combination result by an arbitrary α (0<α<1) as a gain. Next, the adder 72 adds a result of the calculation by the amplifier 73 and a result of the calculation by the amplifier 71, and outputs a result of this addition as an averaged SIR estimate value. The delay unit 74 receives the averaged SIR estimate value, and delays this value by a constant period of time, such as by one slot component, for example. The amplifier 73 multiplies the delayed SIR estimate value by the gain (1−α), and outputs a result of this addition to the adder 72.

Figure 9:
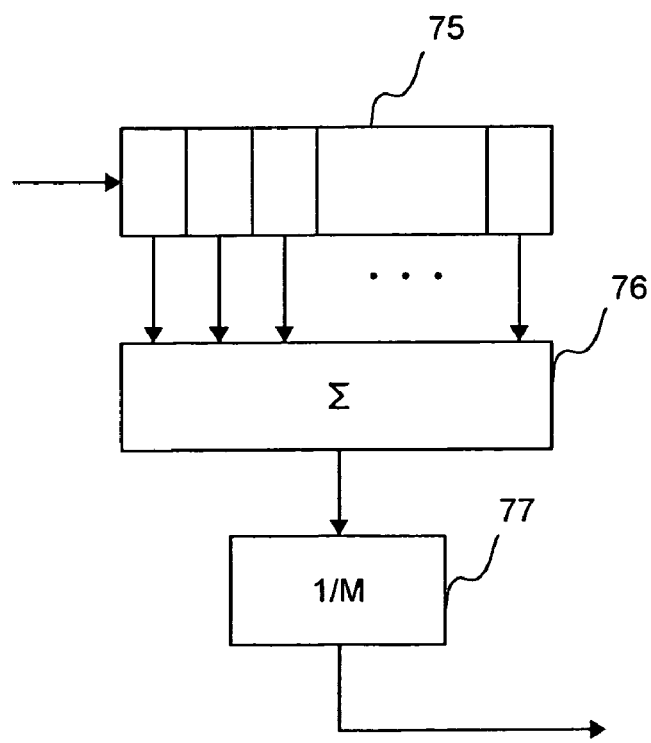
FIG. 9 shows a structure of the averaging section 4.

In the present embodiment, while the structure shown in FIG. 8 is used as an example of the averaging section 4, the structure is not limited to this. It is also possible to use an averaging section as shown in FIG. 9, for example. In FIG. 9, a reference numeral 75 denotes a shift register, 76 denotes an adder, and 77 denotes a divider that divides the result of the addition by an arbitrary M. When the structure shown in FIG. 9 is used, in the averaging section 4, the shift register 75 first receives the combined SIR calculation value, and shifts this by each slot. Next, the adder 76 adds the SIR values of the M slots. Last, the divider 77 divides a result of this addition by M, thereby to obtain an average SIR calculation value of the M slots.

As explained above, in the present embodiment, the common pilot symbol and the known series are added to each slot of the subcarrier group. Therefore, it is possible to obtain a high-precision SIR calculation value for each subcarrier group.

In the present embodiment, after the SIR calculation values obtained for each subcarrier group are combined together, the SIR calculation values are averaged. Therefore, it is possible to obtain a high-precision SIR calculation value, even when there is a level fluctuation such as shadowing.

In the present embodiment, based on a result of the combining of the SIR calculation values obtained for each subcarrier group, the transmitting apparatus controls the transmission power. Therefore, the receiving apparatus can obtain high-precision reception signal quality.

In the present embodiment, the known series are disposed after the common pilot symbol, in each slot. However, it is not always necessary to dispose the known series after the common pilot symbol, and it is also possible to dispose the known series in the middle of the slot or at the end of the slot.

The by-subcarrier channel estimator 306 may calculate a linear interpolation value between two slots, by using a noise-component-suppressed channel estimate value of a subcarrier that is calculated first, and a channel estimate value of a subcarrier similarly calculated when the next slot is input.

Assume that the by-subcarrier channel estimate value of the current slot is expressed as C(0), that the by-subcarrier channel estimate value of the next slot is expressed as C(1), and that the number of symbols between the common pilot symbols is expressed as $(N_{kw}+N_{data})$ (refer to FIG. 4). Then, it is possible to express a channel estimate value "cir(k)" of the $(N_{kw}+N_{data})$ symbols of the known series portions and the data portions within the slots, as follows:

$$cir(k) = C(0)Q_0(k/(N_{kw}+N_{data})) + C(1)Q_1(k/(N_{kw}+N_{data})), \quad (1)$$

where k=0, 1, 2, ..., and $(N_{kw}+N_{data}-1)$. It is possible to express $Q_0$ and $Q_1$ by the following equations (2) and (3) respectively.

$$Q_0(k/(N_{kw}+N_{data}))=1-k/(N_{kw}+N_{data}) \quad (2)$$

$$Q1_0(k/(N_{kw}+N_{data}))=k/(N_{kw}+N_{data}) \quad (3)$$

The by-subcarrier channel estimate values calculated as explained above are output to the fading compensating sections 1-1 to 1-m respectively. The fading compensating sections 1-1 to 1-m carry out the fading compensation. The delay unit 307 sets a delay quantity by taking into account the above linear interpolation processing.

As the by-subcarrier channel estimator 306 carries out the linear interpolation by using the common pilots of two slots for each subcarrier, it is possible to estimate a channel in high precision, even when there occurs a high-speed fading fluctuation that cannot be disregarded within the slots. Therefore, it is possible to carry out a high-precision fading compensation in the symbols of the known-series portion and the data portion. As a result, the precision of the SIR estimate value improves.

Second Embodiment

In the mobile communication system according to a second embodiment, the SIR calculating method of the SIR calculator within the receiving apparatus is different from the SIR calculating method according to the first embodiment. Only the portions that operate differently from those in the first embodiment will be explained below. The transmitting apparatus and the receiving apparatus according to the second embodiment have similar structures to those shown in FIG. 1 and FIG. 2 respectively.

Figure 10:
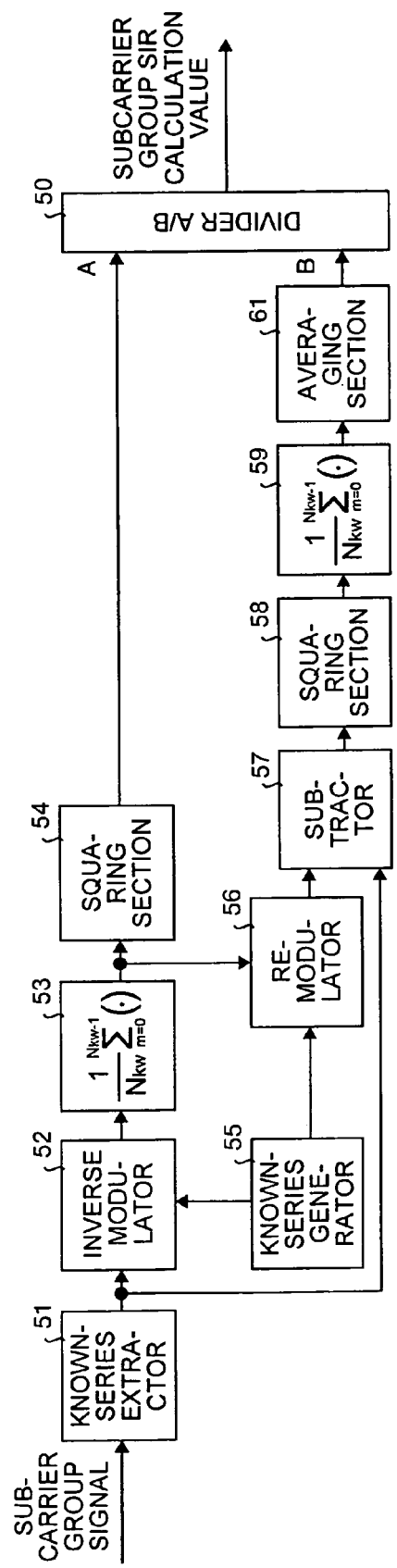
FIG. 10 shows a structure of SIR calculator according to a second embodiment.

FIG. 10 shows a structure of SIR calculator according to the second embodiment. A reference numeral 61 denotes an averaging section. The averaging section 61 is input with average interference power for each slot output from the averaging section 59. The averaging section 61 further averages the average interference power by using a plurality of slots. The structure of the averaging section 61 is the same as that shown in FIG. 8 or FIG. 9.

Even in the present embodiment, it is possible to obtain the effects similar to those obtained in the first embodiment. After estimating the average interference power for each slot, the SIR calculating section further carries out the averaging processing by using a plurality of slots, thereby to calculate interference power. Therefore, it is possible to calculate in higher precision the SIR estimate value as the criterion of the reception signal quality.

In the present embodiment, while the output from the averaging section 4 is the SIR estimate value as shown in FIG. 1, the output is not limited to this. For example, the output from the subcarrier group averaging section 3 may be the SIR estimate value. With this arrangement, even when the signal power varies due to the fading fluctuation, it is possible to calculate the SIR estimate value in high precision by taking into account the fading fluctuation.

The outputs from the SIR calculators 2-1 to 2-n for each subcarrier group may be the SIR estimate values. In this case, the base station can control the transmission power for each subcarrier group based on the SIR information received for each subcarrier group.

The averaging section 4 shown in FIG. 8 or FIG. 9 may be individually provided at the latter stage of each of the SIR calculators 2-1 to 2-n for each subcarrier group, so that the output value from each averaging section may be the SIR estimate value. In this case, it is possible to control the transmission power for each subcarrier group, based on the SIR information for each subcarrier group by taking into account the fading fluctuation.

Third Embodiment

In the mobile communication system according to a third embodiment, the operation of an information modulator within the transmitting apparatus is different from that according to the first or the second embodiment. Only the portions that operate differently from those in the first or the second embodiments will be explained below. The transmitting apparatus and the receiving apparatus according to the third embodiment have similar structures to those shown in FIG. 1 and FIG. 2 respectively.

Figure 11:
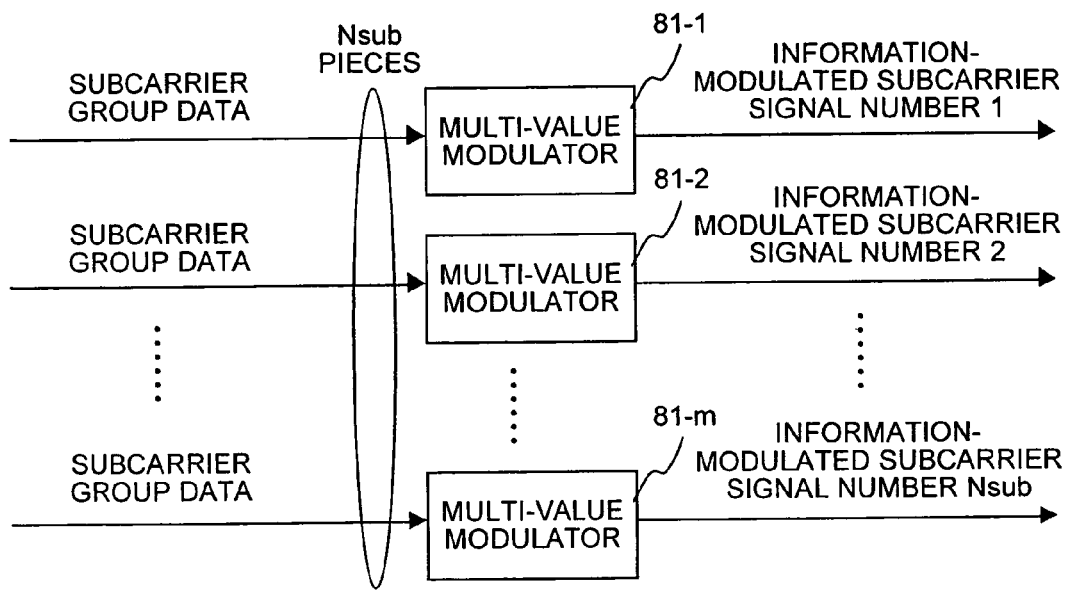
FIG. 11 shows a structure of an information modulator according to a third embodiment.

FIG. 11 shows a structure of the information modulator according to the third embodiment. Reference numerals 81-1, 81-2, ..., and 81-m denote multi-value modulators. Each information modulator receives $N_{sub}$ subcarrier signals. Then, the multi-value modulators 81-1, 81-2, ..., and 81-m multi-value modulate these signals, and generate $N_{sub}$ subcarrier signals after the information modulation. The multi-value modulation includes modulation systems that make it possible to transmit at least one bit per one symbol, such as BPSK, QPSK, 8 PSK, 16 PSK, 16 QAM, 64 QAM, 128 QAM, and 256 QAM.

The operation of the above mobile communication system is explained in detail below. First, the mobile station receiving apparatus estimates the SIR as the reception signal quality. The mobile station transmitting apparatus inserts the estimate result into the transmission slot, and transmits the transmission slot to the base station. The base station transmitting apparatus selects a suitable modulation system based on the received SIR information, and thereafter transmits the data based on the selected modulation system.

Figure 12:
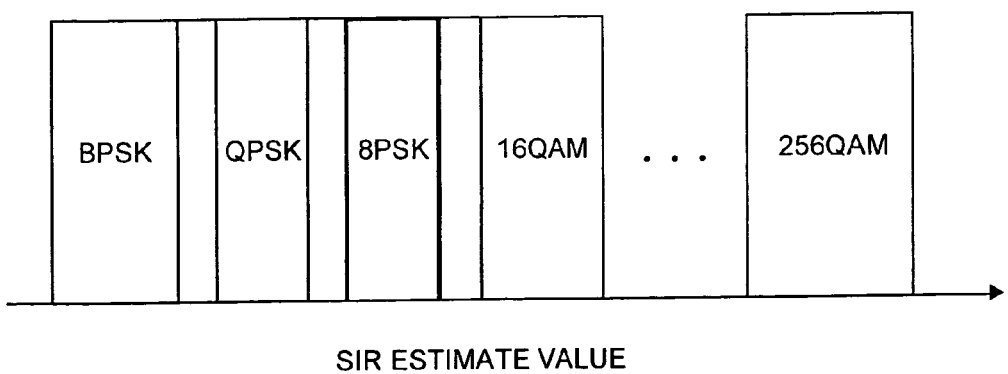
FIG. 12 shows one example of changes of a modulation system.

The common pilot portion and the known-series portion of the transmission slot that the base station transmits are modulated based on a predetermined modulation system. For example, the QPSK modulation system is used for this. For modulating the data portion, any one of the multi-value modulation systems BPSK, QPSK, 8 PSK, 16 PSK, 16 QAM, 64 QAM, 128 QAM, and 256 QAM is used. When the number before the PSK of the modulation system is larger, it is possible to transmit a larger number of bits per one symbol. However, the SIR as the reception signal quality requires a large value in order to satisfy the required reception signal quality. Therefore, the base station changes the modulation system based on the SIR estimate value of the mobile station. FIG. 12 shows one example of changes of a modulation system. There is a possibility that a slight error occurs in the SIR estimate value depending on the states of the transmission lines. Therefore, an overlapping area is provided in the SIR estimate value.

In the present embodiment, it is possible to obtain similar effects to those obtained from the first or the second embodiment. Further, the base station can change the information speed according to the reception SIR from the mobile station. Therefore, it is possible to substantially improve the frequency utilization efficiency.

Fourth Embodiment

In the mobile communication system according to the fourth embodiment, the operation of the spread spectrum section within the transmitting apparatus is different from that according to the first, the second, or the third embodiment. Only the portions that operate differently from those in the first, the second, or the third embodiments will be explained below. The transmitting apparatus and the receiving apparatus according to the fourth embodiment have similar structures to those shown in FIG. 1 and FIG. 2 respectively.

In the present embodiment, each spread spectrum section spreads the spectrum of the $N_{sub}$ information-modulated subcarrier signals, by using mutually orthogonal spread spectrum codes, like in the first embodiment. More specifically, the spread spectrum section multiplies the $N_{sub}$ information-modulated subcarrier signals by each spread spectrum code that is output from the spread spectrum code generator 222 (refer to FIG. 19).

In the present embodiment, the spread spectrum rates that the spread spectrum sections 214-1 to 214-n of the base station transmitting apparatus use are set based on the SIR estimate values that the mobile station receiving apparatus estimates.

In other words, in the present embodiment, the mobile station receiving apparatus estimates the SIR as the reception signal quality. The mobile station transmitting apparatus inserts the estimate result into the transmission slot, and transmits the transmission slot to the base station. The base station transmitting apparatus selects a suitable spread spectrum rate based on the received SIR information, and thereafter, carries out the spread spectrum by using the selected spread spectrum rate, and transmits the data.

Figure 13:
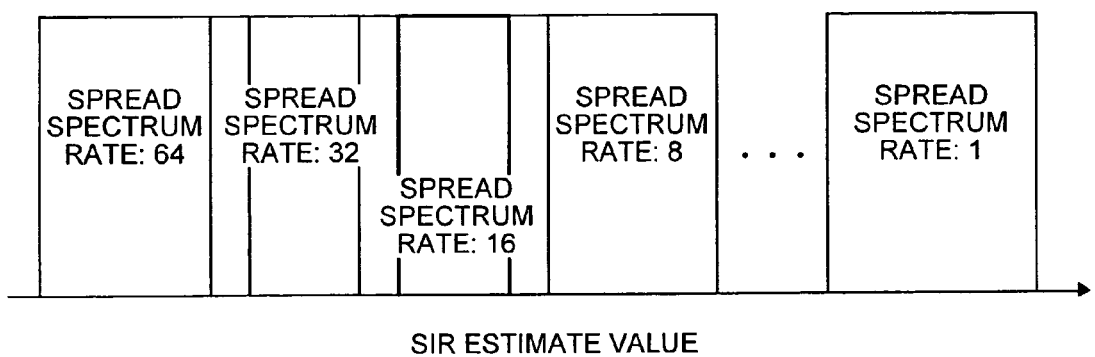
FIG. 13 shows one example of changes of spread spectrum rates.
Figure 14:
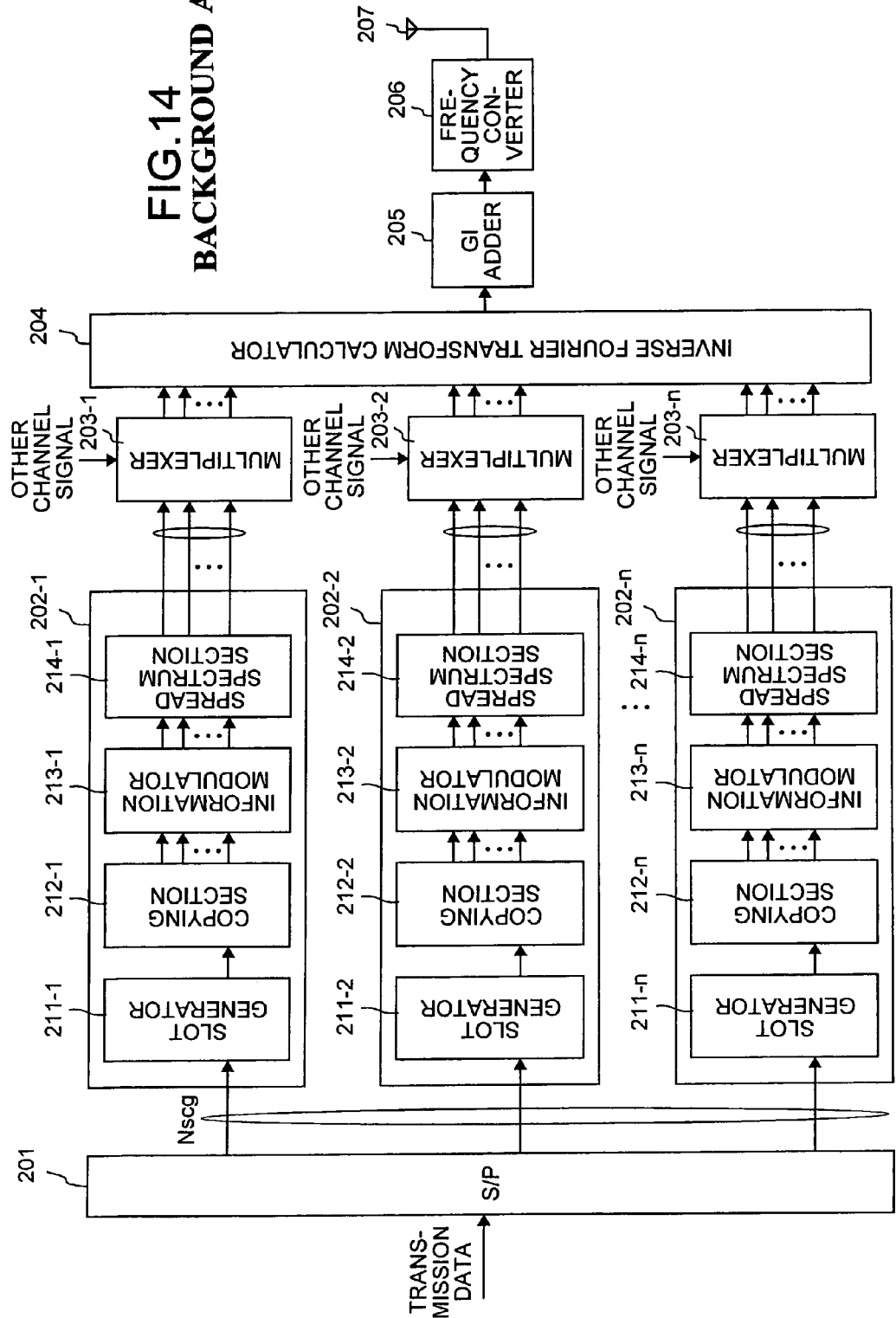
FIG. 14 shows a structure of a conventional multicarrier CDMA transmitting apparatus.
Figure 15:
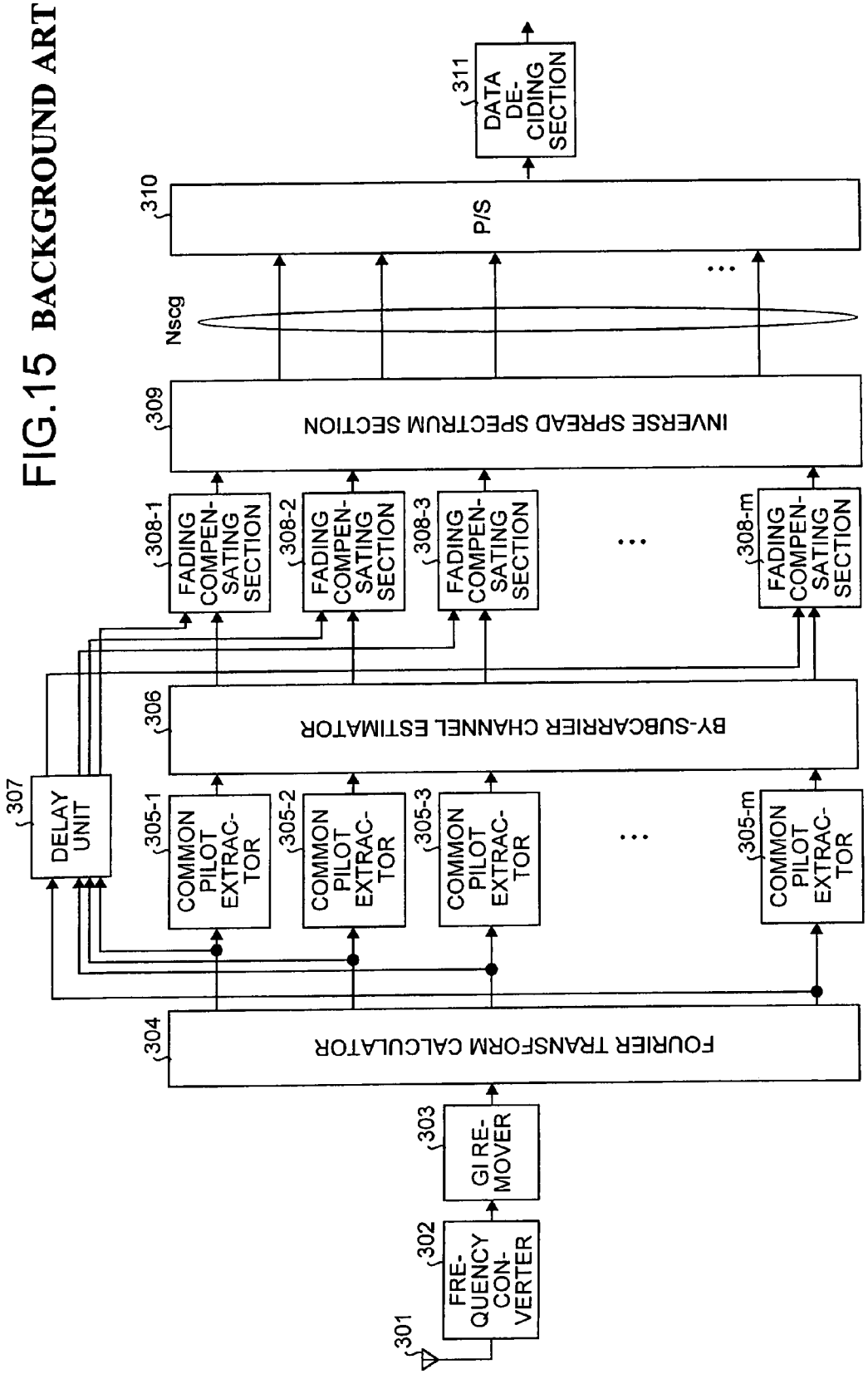
FIG. 15 shows a structure of a conventional multicarrier CDMA receiving apparatus.
Figure 16:
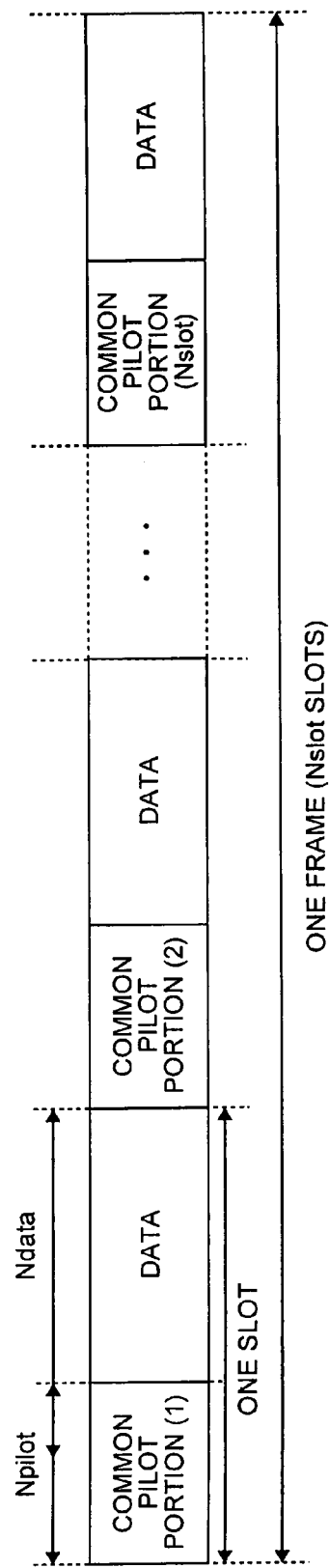
FIG. 16 shows a frame format of a subcarrier.

The base station transmitting apparatus spreads the spectrum of the signal of the known-series portion of the transmission slot, based on a spread spectrum rate determined in advance. The spread spectrum becomes the basis for the receiving apparatus to estimate the SIR. It is possible to use 1, 2, 4, 8, 16, 32, and the like, for the spread spectrum rate of the data portion. As the spread spectrum rate becomes larger, the frequency diversity effect becomes larger. When the low information transmission speed is increased by making the information spreading rate smaller, the SIR as the reception signal quality requires a large value in order to satisfy the required quality. Therefore, the base station can change the spread spectrum rate based on the SIR estimate value of the mobile station. FIG. 13 shows one example of changes of spread spectrum rates. There is a possibility that a slight error occurs in the SIR estimate value depending on the states of the transmission lines. Therefore, an overlapping area is provided in the SIR estimate value.

As explained above, in the present embodiment, it is possible to obtain similar effects to those obtained from the first to the third embodiments. Further, the base station can change the spread spectrum rate according to the reception SIR from the mobile station.

As explained above, according to the present invention, the common pilot symbol and the known series are added to each slot of the subcarrier group. Therefore, there is an effect that it is possible to obtain a high-precision SIR calculation value for each subcarrier group. Further, based on a result of the combining of the SIR calculation values obtained for each subcarrier group, the transmitting apparatus controls the transmission power. Therefore, there is an effect that the receiving apparatus can obtain high-precision reception signal quality.

According to the next invention, as the linear interpolation is carried out using the common pilots of two slots for each subcarrier, it is possible to estimate a channel in high precision, even when there occurs a high-speed fading fluctuation that cannot be disregarded within the slots. Therefore, it is possible to carry out a high-precision fading compensation in the symbols of the known-series portion and the data portion. As a result, there is an effect that the precision of the SIR estimate value improves.

According to the next invention, after the SIR calculation values obtained for each subcarrier group are combined together, the SIR calculation values are averaged. Therefore, there is an effect that t is possible to obtain a high-precision SIR calculation value, even when there is a level fluctuation such as shadowing.

According to the next invention, after the average interference power for each slot is estimated, the averaging processing is further carried out using a plurality of slots, thereby to calculate interference power. Therefore, there is an effect that it is possible to calculate in higher precision the SIR estimate value as the criterion of the reception signal quality.

According to the next invention, even when the signal power varies due to the fading fluctuation, there is an effect that it is possible to calculate the SIR estimate value in high precision by taking into account the fading fluctuation.

According to the next invention, there is an effect that the base station can control the transmission power for each subcarrier group based on the SIR information received for each subcarrier group.

According to the next invention, there is an effect that it is possible to control the transmission power for each subcarrier group based on the SIR information for each subcarrier group by taking into account the fading fluctuation.

According to the next invention, the base station can change the information speed according to the reception SIR from the mobile station. Therefore, there is an effect that it is possible to substantially improve the frequency utilization efficiency.

According to the next invention, there is an effect that the base station can change the spread spectrum rate according to the reception SIR from the mobile station.

According to the next invention, the common pilot symbol and the known series are added to each slot of the subcarrier group. Therefore, there is an effect that the receiving apparatus can obtain a high-precision SIR calculation value for each subcarrier group. Further, based on a result of the combining of the SIR calculation values obtained for each subcarrier group, the transmitting apparatus controls the transmission power. Therefore, there is an effect that the receiving apparatus can obtain high-precision reception signal quality.

According to the next invention, the base station can change the information speed according to the reception SIR from the mobile station. Therefore, there is an effect that it is possible to substantially improve the frequency utilization efficiency.

According to the next invention, there is an effect that the base station can change the spread spectrum rate according to the reception SIR from the mobile station.

According to the next invention, based on a result of the combining of the SIR calculation values obtained for each subcarrier group, the transmitting apparatus controls the transmission power. Therefore, there is an effect that the receiving apparatus can obtain high-precision reception signal quality.

According to the next invention, as the linear interpolation is carried out using the common pilots of two slots for each subcarrier, it is possible to estimate a channel in high precision, even when there occurs a high-speed fading fluctuation that cannot be disregarded within the slots. Therefore, it is possible to carry out a high-precision fading compensation in the symbols of the known-series portion and the data portion. As a result, there is an effect that the precision of the SIR estimate value improves.

According to the next invention, after the SIR calculation values obtained for each subcarrier group are combined together, the SIR calculation values are averaged. Therefore, there is an effect that t is possible to obtain a high-precision SIR calculation value, even when there is a level fluctuation such as shadowing.

According to the next invention, after the average interference power for each slot is estimated, the averaging processing is further carried out using a plurality of slots, thereby to calculate interference power. Therefore, there is an effect that it is possible to calculate in higher precision the SIR estimate value as the criterion of the reception signal quality.

According to the next invention, even when the signal power varies due to the fading fluctuation, there is an effect that it is possible to calculate the SIR estimate value in high precision by taking into account the fading fluctuation.

According to the next invention, there is an effect that the base station can control the transmission power for each subcarrier group based on the SIR information received for each subcarrier group.

According to the next invention, there is an effect that it is possible to control the transmission power for each subcarrier group based on the SIR information for each subcarrier group by taking into account the fading fluctuation.

INDUSTRIAL APPLICABILITY

As explained above, the mobile communication system, the multicarrier CDMA transmitting apparatus, and the multicarrier CDMA receiving apparatus according to the present invention are suitable for use on the frequency selective fading transmission lines.

The invention claimed is:
1. A mobile communication system, which employs multicarrier code division multiple access, comprising a transmitting apparatus and a receiving apparatus,
the transmitting apparatus having
a slot generating unit that (1) generates, for each subcarrier group unit, a slot consisting of (a) a common pilot portion that is not used by a receiving apparatus to estimate a signal to interference ratio, (b) a known series portion, different from the common pilot portion, which the receiving apparatus uses to estimate the signal-to-interference ratio for each subcarrier group, and (c) a data portion, by using transmission data converted for each subcarrier group, (2) copies each slot by a predetermined number of subcarriers, and (3) outputs the slots;

a modulating unit that modulates the signal copied for each subcarrier unit within the subcarrier group;

a spread spectrum unit that individually carries out frequency spreading to a subcarrier signal within the modulated subcarrier group;

a transmission power control unit that controls transmission power of the subcarrier signal after the spreading, for each subcarrier group;

a multiplexing unit that multiplexes the subcarrier signal after the transmission power control, for each subcarrier group; and a transmitting unit that generates a predetermined signal by carrying out an inverse Fourier transformation processing, a guard interval setting processing, and a frequency conversion processing to the multiplexed subcarrier signal, and transmits the signal generated to a transmission line, and the receiving apparatus having a receiving unit that receives a signal on a transmission line, converts the signal received into a baseband signal, and carries out a Fourier transformation processing to the baseband signal;

a common pilot extracting unit that extracts a common pilot portion included in each of the Fourier-transformed subcarrier signals;

a channel estimating unit that calculates a channel estimate value for each subcarrier, by using the common pilot portion;

a delay unit that delays each Fourier-transformed subcarrier signal by a time required to carry out the extraction processing and the channel estimate processing;

a fading compensating unit that carries out a fading compensation to each of the delayed subcarrier signals, by using each of the channel estimate values;

an inverse spread spectrum unit that inverse spreads a frequency of each of the fading-compensated subcarrier signals;

an SIR estimating unit that estimates, for each subcarrier group signal, a signal to interference ratio by using the known series portion included in each subcarrier group signal after the inverse spreading, wherein the SIR estimating unit includes a subcarrier group averaging unit that averages the estimated signal-to-interference ratios corresponding to each subcarrier group and a known series extracting unit that extracts the known series portion from each subcarrier group signal; and a demodulating unit that demodulates the subcarrier group signal after the inverse spreading.

2. The mobile communication system according to claim 1, wherein the channel estimating unit first calculates a channel estimate value for one subcarrier, then calculates a linear interpolation value between two slots by using the calculated channel estimate value of the sub carrier and a channel estimate value of a subcarrier calculated when the next slot is input, and outputs a result of the calculation as a channel estimate value.

3. The mobile communication system according to claim 1, wherein the SIR estimating unit comprises:

a known-series generating unit that generates a known series already known;

an inverse modulating unit that removes a modulation component of the known-series portion by utilizing the known series;

a first averaging unit that suppresses a noise component by carrying out an in-phase averaging processing using the known series portion after the removal of the modulation component;

a first squaring unit that calculates signal power by squaring the known series portion after the averaging processing;

a re-modulating unit that carries out a re-modulation processing by using the known series and the known series portion after the averaging processing;

a subtracting unit that subtracts the re-modulated signal from the known series portion extracted by the known-series extracting unit;

a second squaring unit that squares the signal after the subtraction;

a second averaging unit that carries out an averaging processing of interference power by using a signal output from the second squaring unit;

a dividing unit that divides the signal power by the averaged interference power;

the subcarrier group averaging unit, which combines each result of the division obtained for each subcarrier group, and averages the combined result by dividing it with a number of subcarrier groups used for the combining; and a slot averaging unit that averages the signals averaged using the number of the subcarrier groups, over a plurality of slots.

4. The mobile communication system according to claim 3, wherein the SIR estimating unit makes the output of the subcarrier group averaging unit as an estimate signal-to-interference ratio.

5. The mobile communication system according to claim 3, wherein the SIR estimating unit makes a result of the division obtained for each subcarrier group as an estimate signal to interference ratio.

6. The mobile communication system according to claim 5, wherein the SIR estimating unit averages the result of the division obtained for each subcarrier group, over a plurality of slots for each subcarrier group, and makes a result of the averaging as an estimate signal to interference ratio.

7. The mobile communication system according to claim 1, wherein the SIR estimating unit comprises:

a known-series generating unit that generates a known series already known;

an inverse modulating unit that removes a modulation component of the known-series portion by utilizing the known series;

a first averaging unit that suppresses a noise component by carrying out an in-phase averaging processing using the known series portion after the removal of the modulation component;

a first squaring unit that calculates signal power by squaring the known series portion after the averaging processing;

a re-modulating unit that carries out a re-modulation processing by using the known series and the known series portion after the averaging processing;

a subtracting unit that subtracts the re-modulated signal from the known series portion extracted by the known-series extracting unit;

a second squaring unit that squares the signal after the subtraction;

a second averaging unit that carries out an averaging processing of interference power by using a signal output from the second squaring unit;

a first slot averaging unit that averages the averaged interference power, over a plurality of slots;

a dividing unit that divides the signal power by the averaged interference power obtained by averaging over the slots;

the subcarrier group averaging unit, which combines each result of the division obtained for each subcarrier group, and averages the combined result by dividing it with a number of subcarrier groups used for the combining; and a slot averaging unit that averages for a plurality of slots, the signals averaged using the number of the subcarrier groups.

8. The mobile communication system according to claim 7, wherein the SIR estimating unit makes the output of the subcarrier group averaging unit as an estimate signal to interference ratio.

9. Te mobile communication system according to claim 7, wherein the SIR estimating unit makes a result of the division obtained for each subcarrier group as an estimate signal to interference ratio.

10. The mobile communication system according to claim 9, wherein the SIR estimating unit averages the result of the division obtained for each subcarrier group, over a plurality of slots for each subcarrier group, and makes a result of the averaging as an estimate signal to interference ratio.

11. The mobile communication system according to claim 1, wherein the modulating unit selects any one of modulation systems from among BPSK, QPSK, 8 PSK, 16 PSK, 16 QAM, 64 QAM, 128 QAM, and 256 QAM, according to the received signal to interference ratio.

12. The mobile communication system according to claim 1, wherein the spread spectrum unit selects a suitable spread spectrum rate according to the received signal to interference ratio.

13. A multicarrier code division multiple access transmitting apparatus, comprising:

a slot generating unit that (1) generates, for each subcarrier group unit, a slot consisting of (a) a common pilot portion that is not used by a receiving apparatus to estimate a signal to interference ratio, (b) a known series portion, different from the common pilot portion, which the receiving apparatus uses to estimate the signal to interference ratio for each subcarrier group, and (c) a data portion, by using transmission data converted for each subcarrier group, (2) copies each slot by a predetermined number of subcarriers, and (3) outputs the slots;

a modulating unit that modulates the copied signal for each subcarrier unit within the subcarrier group;

a spread spectrum unit that frequency spreads a spectrum of each of the subcarrier signals within the modulated subcarrier group;

a transmission power control unit that controls transmission power of the subcarrier signal after the spreading, for each subcarrier group based on reception signal quality at the receiving apparatus;

a multiplexing unit that multiplexes the subcarrier signal after the transmission power control, for each subcarrier group; and a transmitting unit that generates a predetermined signal by carrying out an inverse Fourier transformation processing, a guard interval setting processing, and a frequency conversion processing to the multiplexed subcarrier signal, and transmits the generated signal to a transmission line.

14. The multicarrier code division multiple access transmitting apparatus according to claim 13, wherein the modulating unit selects any one of modulation systems from among BPSK, QPSK, 8 PSK, 16 PSK, 16 QAM, 64 QAM, 128 QAM, and 256 QAM, according to the received signal to interference ratio.

15. The multicarrier code division multiple access transmitting apparatus according to claim 13, wherein the spread spectrum unit selects a suitable spread spectrum rate according to the received signal to interference ratio.

16. A multicarrier code division multiple access receiving apparatus, comprising:

a receiving unit that converts a received signal on a transmission line into a baseband signal, and carries out a Fourier transformation processing to the baseband signal;

a common pilot extracting unit that extracts a common pilot portion included in each of the Fourier-transformed subcarrier signals;

a channel estimating unit that calculates a channel estimate value for each subcarrier, by using the common pilot portion;

a delay unit that delays each Fourier-transformed subcarrier signal by a time required to carry out the extraction processing, and the channel estimate processing;

a fading compensating unit that carries out a fading compensation to each of the delayed subcarrier signals, by using each of the channel estimate values;

an inverse spread spectrum unit that inverse spreads a frequency of each of the fading-compensated subcarrier signals;

an SIR estimating unit that estimates, for each subcarrier group signal, a signal-to-interference ratio by using a known series portion, different from the common pilot portion, included in each subcarrier group signal after the inverse spreading, wherein the SIR estimating unit includes a subcarrier group averaging unit that averages the estimated signal-to-interference ratios corresponding to each subcarrier group and a known series extracting unit that extracts the known series portion from each subcarrier group signal; and a demodulating unit that demodulates the subcarrier group signal after the inverse spreading.

17. The multicarrier code division multiple access receiving apparatus according to claim 16, wherein the channel estimating unit first calculates a channel estimate value for one subcarrier, then calculates a linear interpolation value between two slots by using the calculated channel estimate value of the subcarrier and a channel estimate value of a subcarrier calculated when the next slot is input, and outputs a result of the calculation as a channel estimate value.

18. The multicarrier code division multiple access receiving apparatus according to claim 16, wherein the SIR estimating unit comprises:

a known-series generating unit that generates a known series already known;

an inverse modulating unit that removes a modulation component of the known-series portion by utilizing the known series;

a first averaging unit that suppresses a noise component by carrying out an in-phase averaging processing using the known series portion after the removal of the modulation component;

a first squaring unit that calculates signal power by squaring the known series portion after the averaging processing;

a re-modulating unit that carries out a re-modulation processing by using the known series and the known series portion after the averaging processing;

a subtracting unit that subtracts the re-modulated signal from the known series portion extracted by the known-series extracting unit;

a second squaring unit that squares the signal after the subtraction;

a second averaging unit that carries out an averaging processing of interference power by using a signal output from the second squaring unit;

a dividing unit that divides the signal power by the averaged interference power;

the subcarrier group averaging unit, which combines each result of the division obtained for each subcarrier group, and averages the combined result by dividing it with a number of subcarrier groups used for the combining; and a slot averaging unit that averages the signals averaged using the number of the subcarrier groups, over a plurality of slots.

19. The multicarrier code division multiple access receiving apparatus according to claim 18, wherein the SIR estimating unit makes the output of the subcarrier group averaging unit as an estimate signal to interference ratio.

20. The multicarrier code division multiple access receiving apparatus according to claim 18, wherein the SIR estimating unit makes a result of the division obtained for each subcarrier group as an estimate signal to interference ratio.

21. The multicarrier code division multiple access receiving apparatus according to claim 20, wherein the SIR estimating unit averages the result of the division obtained for each subcarrier group, over a plurality of slots for each subcarrier group, and makes a result of the averaging as an estimate signal to interference ratio.

22. The multicarrier code division multiple access receiving apparatus according to claim 16, wherein the SIR estimating unit comprises:

a known-series generating unit that generates a known series already known;

an inverse modulating unit that removes a modulation component of the known-series portion by utilizing the known series;

a first averaging unit that suppresses a noise component by carrying out an in-phase averaging processing using the known series portion after the removal of the modulation component;

a first squaring unit that calculates signal power by squaring the known series portion after the averaging processing;

a re-modulating unit that carries out a re-modulation processing by using the known series and the known series portion after the averaging processing;

a subtracting unit that subtracts the re-modulated signal from the known series portion extracted by the known-series extracting unit;

a second squaring unit that squares the signal after the subtraction;

a second averaging unit that carries out an averaging processing of interference power by using a signal output from the second squaring unit;

a first slot averaging unit that averages the averaged interference power, over a plurality of slots;

a dividing unit that divides the signal power by the averaged interference power obtained by averaging over the slots;

the subcarrier group averaging unit, which combines each result of the division obtained for each subcarrier group, and averages the combined result by dividing it with a number of subcarrier groups used for the combining; and a slot averaging unit that averages for a plurality of slots, the signals averaged using the number of the subcarrier groups.

23. The multicarrier code division multiple access receiving apparatus according to claim 22, wherein the SIR estimating unit makes the output of the subcarrier group averaging unit as an estimate signal to interference ratio.

24. The multicarrier code division multiple access receiving apparatus according to claim 22, wherein the SIR estimating unit makes a result of the division obtained for each subcarrier group as an estimate signal to interference ratio.

25. The multicarrier code division multiple access receiving apparatus according to claim 24, wherein the SIR estimating unit averages the result of the division obtained for each subcarrier group, over a plurality of slots for each subcarrier group, and makes a result of the averaging as an estimate signal to interference ratio.

* * * * *